(12) United States Patent
Cheng et al.

(10) Patent No.: US 10,379,627 B2
(45) Date of Patent: Aug. 13, 2019

(54) HANDHELD DEVICE AND POSITIONING METHOD THEREOF

(71) Applicant: PIXART IMAGING INC., Hsin-Chu (TW)

(72) Inventors: Han-Ping Cheng, Hsin-Chu (TW); Chao-Chien Huang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 135 days.

(21) Appl. No.: 15/687,525

(22) Filed: Aug. 27, 2017

(65) Prior Publication Data

US 2017/0371425 A1 Dec. 28, 2017

Related U.S. Application Data

(63) Continuation of application No. 14/536,769, filed on Nov. 10, 2014, now Pat. No. 9,804,689, which is a (Continued)

(30) Foreign Application Priority Data

Dec. 6, 2013 (TW) .............................. 102144801 A

(51) Int. Cl.
*G06F 3/03* (2006.01)
*G06F 3/038* (2013.01)
*G06F 3/0346* (2013.01)

(52) U.S. Cl.
CPC .......... *G06F 3/0304* (2013.01); *G06F 3/0346* (2013.01); *G06F 3/0383* (2013.01)

(58) Field of Classification Search
CPC ..... G06F 3/0304; G06F 3/0346; G06F 3/0383
See application file for complete search history.

(56) References Cited

U.S. PATENT DOCUMENTS 5,424,756 A * 6/1995 Ho ........................ G06F 1/1616
345/158
6,411,278 B1 6/2002 Kage et al.
(Continued)

FOREIGN PATENT DOCUMENTS

| CN | 101388138 | 3/2009 |
| CN | 101398721 | 4/2009 |

(Continued)

*Primary Examiner* — Alexander Eisen
*Assistant Examiner* — Kebede T Teshome
(74) *Attorney, Agent, or Firm* — Li & Cai Intellectual Property (USA) Office

(57) ABSTRACT

A positioning method and a handheld device for performing the method are disclosed. In the method, a handheld device captures images corresponding to positions of a reference when the handheld device points toward the reference. A first image position, a first tilt angle indicative of a rotation angle of the handheld device, and a first pointing coordinate of the reference can obtained. A second pointing coordinate according to the first image position and a second tilt angle are obtained. Therefore, a first displacement vector between the first pointing coordinate and the second pointing coordinate can be computed. A third pointing coordinate can also be obtained. When a substantial movement of the positions of the reference revealed in the images captured by the handheld device is found, an output pointing coordinate is obtained. The output can be outputting a cursor parameter for controlling a cursor controlled by the handheld device.

20 Claims, 11 Drawing Sheets

Related U.S. Application Data continuation-in-part of application No. 13/771,072, filed on Feb. 19, 2013, now abandoned, and a continuation-in-part of application No. 14/273,523, filed on May 8, 2014, now Pat. No. 10,067,576.

(56) References Cited

U.S. PATENT DOCUMENTS

| | | |
|---|---|---|
| 7,256,772 B2 | 8/2007 | Morrison |
| 7,942,745 B2 | 5/2011 | Ikeda et al. |
| 8,010,313 B2 | 8/2011 | Mathews et al. |
| 2007/0211027 A1 | 9/2007 | Ohta |
| 2007/0236451 A1 | 10/2007 | Ofek et al. |
| 2008/0122788 A1 | 5/2008 | Sirtori |
| 2008/0180396 A1 | 7/2008 | Lin et al. |
| 2008/0204406 A1 | 8/2008 | Ueno |
| 2009/0009469 A1 | 1/2009 | Hsu et al. |
| 2009/0052730 A1 | 2/2009 | Lin |
| 2009/0066646 A1 | 4/2009 | Choi et al. |
| 2010/0182235 A1 | 7/2010 | Niikura et al. |
| 2010/0259477 A1 | 10/2010 | Kabasawa et al. |
| 2011/0298710 A1 | 12/2011 | Ruckhaenerle et al. |
| 2013/0021246 A1 | 1/2013 | Choi et al. |
| 2013/0093675 A1 | 4/2013 | Lin et al. |
| 2013/0328772 A1 | 12/2013 | Cheng et al. |

FOREIGN PATENT DOCUMENTS

| | | |
|---|---|---|
| EP | 2225628 A | 9/2010 |
| TW | 200928897 | 7/2009 |
| TW | 201122992 | 7/2011 |
| TW | 201305854 | 2/2013 |
| WO | WO 2009/080653 A1 | 7/2009 |

\* cited by examiner

HANDHELD DEVICE AND POSITIONING METHOD THEREOF

CROSS REFERENCE TO RELATED APPLICATIONS

This U.S. Non-provisional Application is a continued application of a continuation-in-Part of application Ser. No. 14/536,769, filed on Nov. 10, 2014, now status pending and entitled "HANDHELD POINTER DEVICE AND POINTER POSITIONING METHOD THEREOF", which is a continuation-in-Part of application Ser. No. 13/771,072, filed Feb. 19, 2013, now status pending, and entitled "HAND-HELD POINTING DEVICE", a continuation-in-Part of application Ser. No. 14/273,523, filed May 8, 2014, now status pending, and entitled "HANDHELD POINTER DEVICE AND TILT ANGLE ADJUSTMENT METHOD THEREOF", and further claims the priority to Taiwan patent application No. 102144801, filed Dec. 6, 2013, entitled "POINTER DEVICE AND POINTER POSITIONING METHOD THEREOF". The entire specification of which is hereby incorporated by reference in its entirety for all purposes.

The application Ser. No. 14/273,523, filed May 8, 2014, now status pending, and entitled "HANDHELD POINTER DEVICE AND TILT ANGLE ADJUSTMENT METHOD THEREOF", which is also a Continuation-In-Part of application Ser. No. 13/771,072, filed Feb. 19, 2013, now status pending, and entitled "HAND-HELD POINTING DEVICE", which claims the priority to Taiwan patent application Ser. No. TW102118058, and Taiwan patent application Ser. No. TW101120524.

BACKGROUND

1. Technical Field

The present disclosure relates to a positioning method in particular, to the positioning method for outputting position of a handheld device.

2. Description of Related Art

A handheld pointer device is operable to compute pointing coordinates thereof by analyzing image positions of at least one reference light source formed in images captured and to transmit pointing coordinates computed to a video game console for assisting gaming process executed on the video game console. Currently, handheld pointer devices have been widely used in many types of interactive gaming systems such as light gun games, baseball games, tennis games, and the like.

It is well known in the art the that the distance between an image sensor installed on a handheld pointer device and a display apparatus and the rotation angle of the image sensor while capturing the images affect the computation of pointing coordinates thereafter. Hence, to enhance user's operability, a handheld pointer device is typically equipped with at least one tilt sensing device for constantly detecting the instant rotation angle of the handheld pointer device and correspondingly updating the tilt angle used in calculation of pointing coordinates. The relative movement of the handheld pointer device with respective to the position of the reference light source thus can be accurately computed and determined, thereby avoid erroneous position determination of the reference point.

However, whenever the handheld pointer device updates the tilt angle presently used in the computation of pointing coordinate, the handheld pointer device will instantly compute the pointing coordinate using the newly updated tilt angle and the image position of the reference light source in the sensing area of the image sensor computed and control the movement of the cursor, accordingly. As a result, cursor displayed on the display apparatus would suddenly jump from one place to another, and reduce user's operability, at same time, increases operation inconvenience.

SUMMARY

Accordingly, an exemplary embodiment of the present disclosure provide a positioning method for a handheld device, and the positioning method can cause the handheld device to automatically compensate and correct pointing coordinates computed based on the displacement generated as the handheld device updated the tilt angle thereof.

In one aspect, an exemplary embodiment of the present disclosure provides a positioning method performed in a handheld device. In the method, a first image position of a reference is obtained. Further, a first pointing coordinate according to the first image position and a first tilt angle indicative of a rotation angle of the handheld device are computed. A second pointing coordinate according to the first image position and a second tilt angle are computed. The second tilt angle is rendered based on a movement of the first image position of the reference. A first displacement vector between the first pointing coordinate and the second pointing coordinate is then computed. A unit displacement according to the first displacement vector in a predetermined number of calculations is computed. A second image position of the reference is obtained. A third pointing coordinate according to the second image position and the second tilt angle is obtained. An output pointing coordinate according to the third pointing coordinate and the unit displacement is therefore obtained.

In one further aspect, a handheld device for performing the positioning method is provided. The handheld device includes an image capturing unit configured to capture images of frames containing a reference, and a processing unit configured to perform the positioning method described above.

The processing unit drives the image capturing unit to capture a first frame containing the reference to respectively compute the first pointing coordinate and the second pointing coordinate using the first and the second tilt angles in coordination with the first frame.

The handheld device further includes an accelerometer unit that is configured to detect a plurality of accelerations of the handheld device over multiple axes and generate an acceleration vector. After that, the handheld device updates the first tilt angle to the second tilt angle upon determined that a magnitude of an acceleration vector of the handheld device is equal to a gravitational acceleration of the handheld device, wherein the acceleration vector is generated by the handheld device according to accelerations of the handheld device detected over multiple axes.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
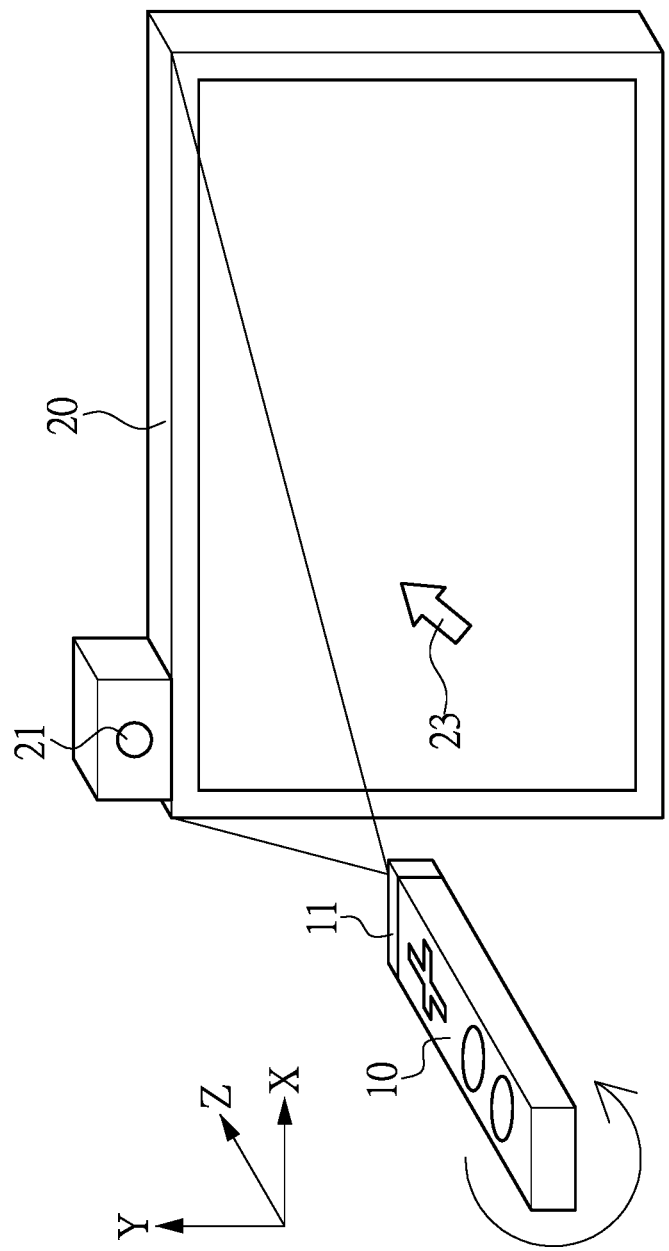
FIG. 1 is a diagram illustration an operation of a handheld device in an interactive system provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

(An Exemplary Embodiment of a Handheld Device)

A handheld device of the present disclosure may act as a pointer that can be adapted for positioning a pointer (such as a cursor) on a display apparatus. Please refer to FIG. 1, which shows a diagram illustration an operation of a handheld device in an interactive system provided in accordance to an exemplary embodiment of the present disclosure. An interactive system of the instant embodiment includes a handheld device 10 and a display apparatus 20. The display apparatus 20 is equipped with at least one reference point 21, which is provided to the handheld device 10 to use as reference for controlling the movement of a cursor 23 displayed on the display apparatus 20.

In the instant embodiment, the display apparatus 20 is configured to have the necessary software and hardware architectures for executing data and displaying software application. The display apparatus 20 includes but not limited to a projection display, a game console display, a television, or a monitor of a computer system. In practice, depending upon the practical operational requirements of the interactive system, the interactive system can further include a host computer (not shown) such as video game console or a computer. The host computer can be configured to operatively process the program codes associated with a software application (e.g., video games such as light gun games, baseball games, tennis games and the like) and execute the software application. The host computer further can be configured to display the execution progress of the software application on the display apparatus 20 for the user to view and perform the corresponding control operations.

The reference point 21 is placed near the display apparatus 20 and is provided to the handheld device 10 for determining the pointing position thereof 10, i.e., determines the moving direction and the displacement of the handheld device 10 relative to the reference point 21.

The reference point 21 can be implemented by a plurality of light emitting diodes with specific wavelength, such as infrared light emitting diodes (IR LED), laser diodes, or ultraviolet light emitting diodes, arranged in a regular or irregular shape. Moreover, the light emitting diodes may be configured to electrically connect to the display apparatus 20 or may be powered by an independent power source for lighting. It shall be noted that the number of the reference point is not limited to one as used in the instant embodiment. Those skilled in the art should be able to configure the exact number of the reference point 21 required to be one, two, or more than two according to the practical design and/or operational requirements. In other words, FIG. 1 is merely used to illustrate an operation of the handheld device 10, and the instant disclosure is not limited thereto.

Briefly, the handheld device 10 operatively drives an image capturing unit 11 installed thereon to capture images of the reference point 21 as the handheld device 10 points toward the position of the reference point 21 and sequentially generates a plurality of frames containing the image of the reference point 21. The handheld device 10 operatively computes a pointing coordinate generated as the handheld device 10 points toward the display apparatus 20 according to an image position of the reference point 21 formed in one of the frames captured and the tilt angle presently used in the pointing coordinate calculation. Next, the handheld device 10 computes the cursor position of the cursor 23 on the display apparatus 20 according to the pointing coordinate computed. The handheld device 10 further wirelessly transmits a cursor parameter generated based on the relative movement of the reference point 21 for controlling the display position of the cursor 23 to the display apparatus 20. The handheld device 10 thus controls the movement of the cursor 23 displayed on the display apparatus 20.

The handheld device 10 may further determine whether to update a first tilt angle (i.e., the current rotation angle of the handheld device 10) being presently used to a second tilt angle based on the movement of image positions of the reference point 21 in frames captured. In one embodiment, the handheld device 10 may first determine whether the handheld device 10 is in motion or at rest by determining whether or not the image position of the reference point 21 formed in consecutive frames has substantially moved. The handheld device 10 subsequently determines whether to update the tilt angle presently used in computing the pointing coordinate according to the determination result. In another embodiment, the handheld device 10 may also determine whether the handheld device 10 is in motion or at rest by determining whether pointing coordinates computed based on the image positions of the reference point 21 formed in frames captured using the first tilt angle has substantially moved. The handheld device 10 determines whether to update the tilt angle presently used in computing pointing coordinate according to the determination result thereafter.

It worth to note that the phrase of the reference point 21 has substantially moved herein indicates that the reference point 21 has moved over a short period of time (i.e., a second, a millisecond, two adjacent frames, or multiple consecutive frames). Whether the reference point 21 has substantially moved can be determined by the position displacement of the image position of the reference point 21 formed in consecutive frames captured, or the velocity of the image position of the reference point 21 formed in the consecutive frames captured, or the acceleration of image position of the reference point 21 formed in the consecutive frames captured, or the displacement, the velocity, or the acceleration of pointing coordinates computed based on consecutive frames captured.

In one embodiment, the handheld device 10 may use an inertial sensor to sense and compute the instant tilt angle of the handheld device 10. However, the force exerted by the user onto the handheld device 10 while the user operates the handheld device 10, might affect the gravitational direction determination result detected by the inertial sensor. Hence, the impact of the user on the handheld device 10 while the user operates the handheld device 10 must be removed or eliminated in order to accurately compute and update the tilt angle of the handheld device 10. In particular, when determines that the handheld device 10 being operated by the user has not substantially moved (i.e., the reference point 21 detected has not substantially moved), the handheld device 10 can be regarded as unaffected by the external force exerted thereon. The handheld device 10 thus can accurately sense and compute the instant rotation angle of the handheld device 10, and update the first tilt angle presently used by the handheld device 10 to the second tilt angle.

When the handheld device 10 determines to update the first tilt angle presently used to the second tilt angle, the handheld device 10 operatively captures a first frame containing the reference point 21. The handheld device 10 computes a first pointing coordinate relative to the display apparatus 20 according to the image position of the reference pointer 21 formed in the first frame and the first tilt angle. The handheld device 10 further computes the cursor position according to the first pointing coordinate computed to correspondingly generate the cursor parameter for controlling the display position of the cursor 23 on the display apparatus 20.

The handheld device 10 then computes a second pointing coordinate relative to the display apparatus 20 according to the image position of the reference pointer 21 formed in the first frame and the second tilt angle. Thereafter, in the subsequent computation of a third pointing coordinate, the handheld device 10 operatively determines whether or not to perform a cursor position calibration process to calibrate and correct the third pointing coordinate computed according to the displacement vector between the first and the second pointing coordinates (i.e., the displacement of the cursor 23) during the computation of a third pointing coordinate according to the image position of the reference pointer 21 formed in the first frame and the second tilt angle.

When the handheld device 10 determines that the displacement vector between the first and the second pointing coordinates is computed to be greater than or equal to a first predetermined threshold, the handheld device 10 operatively corrects the third pointing coordinate for compensating the offset generated as the handheld device 10 updates the tilt angle thereof. More specifically, the handheld device 10 computes a cursor position according to the first pointing coordinate, the second pointing coordinate, and the third pointing coordinate, so as to correspondingly generate the cursor parameter for controlling the display position of the cursor 23 on the display apparatus 20. On the other hand, when the handheld device 10 determines that the displacement vector between the first and the second pointing coordinates is computed to be less than the first predetermined threshold, the handheld device 10 directly computes the cursor position according to the third pointing coordinate without apply any compensation and correspondingly generate the cursor parameter to control the display position of the cursor 23 on the display apparatus 20.

Accordingly, the occurrence that the cursor 23 suddenly jumps from one place to another after the operation of updating the tilt angle negatively affecting the user's operation with handheld device 10 can be effectively prevented or eliminated.

In another embodiment, the handheld device 10 can also determine whether to calibrate and correct the pointing coordinate computed using the updated tilt angle (i.e. the second tilt angle) according to the angle difference between the first tilt angle and the second tilt angle.

For instance, the handheld device 10 calibrates and corrects the pointing coordinate (i.e., the third pointing coordinate) computed in the subsequent cursor position computation using the updated tilt angle when the angle difference between the first tilt angle presently used and the second tilt angle is computed to be larger than a preset angle.

When the handheld device 10 has determined to compensate pointing coordinates computed after the operation of updating the first tilt angle to the second tilt angle, the handheld device 10 completes a cursor position calibration within a preset calibration time or preset number of calibration and causes the cursor 23 to smoothly move from the movement path that corresponds to the first tilt angle to the movement path that corresponds to the second tilt angle. The handheld device 10 thus can accurately compute the relative moving information of the handheld device 10 with respect to the display apparatus 20 and precisely control the movement of the cursor 23 on the display apparatus 20, at the same time prevent user's operation with the handheld device 10 from being affected by the tilt angle update.

It is worth to note that the handheld device 10 is operable to determine whether to calibrate and correct the pointing coordinate computed using the updated tilt angle after each tilt angle update (i.e., configure the first predetermined threshold and the preset angle) as well as the associated calibration and compensation method (i.e., the amount of compensation in each calibration and the preset calibration time) according to the type of the software program executed by the display apparatus 20 as well as the resolution of the display apparatus 20.

To put it concretely, the handheld device 10 can pre-store multiple sets of calibration parameter associated with different resolutions of the display apparatus 20 and the type of software application.

For instance, when the type of the software application currently executed by the display apparatus 20 requires high precision (such as displaying rapid motion images), then the value of the first predetermined threshold or the value of the preset angle should be configured to be relatively small, such that the handheld device 10 executes a calibration program and calibrates pointing coordinate after each tilt angle updates, so as to increase the directivity of the handheld device 10.

For another instance, when the type of the software application currently executed by the display apparatus 20 does not require high precision (such as displaying still images), then the value of the first predetermined threshold or the value of the preset angle should be configured to be relatively larger such that the handheld device 10 does not have to calibrate the pointing coordinate after each tilt angle update, or does not have to execute the calibration program of pointing coordinate after each tilt angle adjustment, and reduces the number of calibration needed, thereby reduces the computational complexity of the pointing coordinates.

In one implementation, the handheld device 10 can automatically link with the display apparatus 20 at start up and access the type of the software application currently executed on the display apparatus 20. Then, the handheld device 10 operatively determines whether to calibrate and correct pointing coordinates computed by the handheld device 10 after tilt angle update based on the type of the software program currently executed on the display apparatus 20, and selects the appropriate calibration parameters. Accordingly, the applicability and operation convenience of the handheld device 10 can be enhanced.

Figure 2:
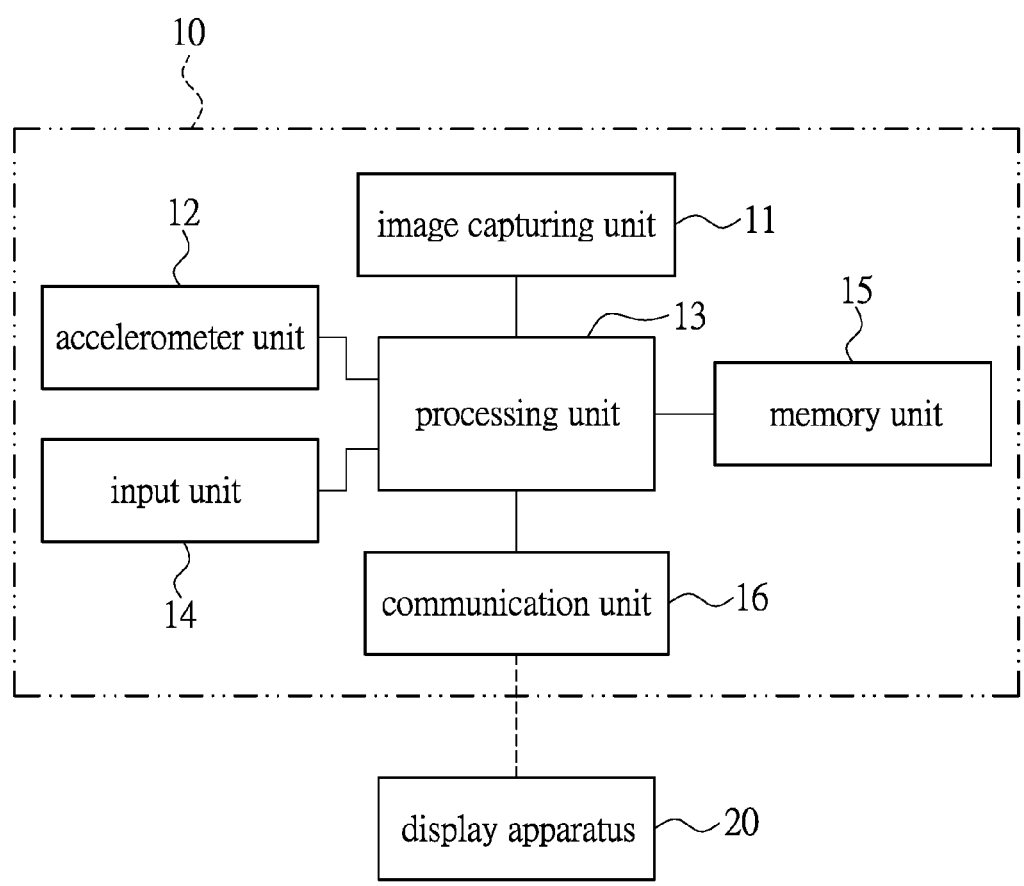
FIG. 2 is a block diagram of a handheld device provided in accordance to an exemplary embodiment of the present disclosure.

More specifically, please refer to FIG. 2 in conjunction with FIG. 1, wherein FIG. 2 shows a block diagram of a handheld device provided in accordance to an exemplary embodiment of the present disclosure. The handheld device 10 includes an image capturing unit 11, an accelerometer unit 12, a processing unit 13, an input unit 14, a memory unit 15, and a communication unit 16. The image capturing unit 11, the accelerometer unit 12, the input unit 14, the memory unit 15, and the communication unit 16 are coupled to the processing unit 13, respectively.

It is worth to note that, in another embodiment, the accelerometer unit 12 can be integrated with the image capturing unit 11. In particular, the accelerometer unit 12 is electrically connected to the processing unit 13 through the image capturing unit 11. Alternatively, in other embodiments, at least one of the image capturing unit 11, the accelerometer unit 12, the input unit 14, the memory unit 15, and the communication unit 16 and another component thereof may be configured to electrically connect the processing unit 13 in series.

The image capturing unit 11 is configured to operatively capture images containing the reference point 21 as the handheld device 10 pointing toward the reference point 21 and sequentially generate a plurality of frames. Specifically, the image capturing unit 11 can be configured to operatively detect the light emitted from the reference point 21 according to a frame capturing rate (for example, 200 frames per second), and sequentially generates a plurality of frames containing the image of the reference point 21.

An optical filter (not shown) can be used for filtering out light spectrum outside the specific light spectrum generated by the reference point 21 such that the image capturing unit 11 only detects the light having wavelength within the specific light spectrum generated by the reference point 21.

In the instant embodiment, the image capturing unit 11 can be implemented by a charge-coupled device (CCD) image sensor or a complementary metal oxide semiconductor (CMOS) image sensor. Those skilled in the art should be able to design and implement the image capturing unit 11 according to practical operation requirements, and the instant embodiment is not limited to the example provided herein.

The accelerometer unit 12 is configured to detect a plurality of accelerations of the handheld device 10 over multiple axes (e.g., X-axis, Y-axis, and Z-axis) of a space, and generate an acceleration vector, accordingly. The accelerometer unit 12 in the instant embodiment includes but not limited to a G-sensor or an accelerometer, and the accelerometer unit 12 can be built-in in the handheld device 10. Certainly, in other embodiments, the accelerometer unit 12 may be implemented by an external device connected to the handheld device 10. Those skilled in the art should be able to implement the accelerometer unit 12 according to the practical operation and/or design requirements and the instant present disclosure is not limited to the example provided herein.

The processing unit 13 is configured to receive frames outputted by the image capturing unit 11 and compute an image position of the reference point 21 formed in one of the frames according to the respective frame among the frames captured. The processing unit 13 operatively computes the pointing coordinate of the handheld device 10 with respective to the position of the reference point 21 using the first tilt angle. The processing unit 13 further computes the cursor position based on the pointing coordinate computed, so as to correspondingly generate the cursor parameter controlling the movement (i.e., the display position) of the cursor. Thereafter, the processing unit 13 drives the communication unit 16 and wirelessly transmits the cursor parameter to the display apparatus 20 to correspondingly control the movement of the cursor 23 displayed on the display apparatus 20 in coordination with the execution of the software program on the display apparatus 20.

More specifically, the processing unit 13 can operatively determine whether the reference point 21 has moved based on frames captured, i.e., whether the image position of the reference point 21 has substantially moved. When the processing unit 13 determines that the reference point 21 has not substantially moved, the processing unit 13 instantly reads the accelerations of the handheld device 10 over multiple axes detected by the accelerometer unit 12. The processing unit 13 computes and updates the first tilt angle presently used to the second tilt angle according to the accelerations of the handheld device 10 detected. The processing unit 13 then uses the second tilt angle updated and the image position of the reference point 21 formed in one of the frames to compute the pointing coordinate of the handheld device 10 relative to the display apparatus 20.

In one embodiment, the processing unit 13 can compute the instant tilt angle of the handheld device 10 using the accelerations of the handheld device 10 over X-axis, Y-axis, and Z-axis detected by the accelerometer unit 12 and the included angles computed between any two axes, and update the first tilt angle to the second tilt angle, accordingly.

On the contrary, when the processing unit 13 determines that the position of the reference point 21 has substantially moved, the processing unit 13 does not update the first tilt angle presently used as the processing unit 13 operatively determines that the accelerometer 13 is currently unable to made accurately acceleration measurement associated with the handheld device 10. The processing unit 13 continues to use the first tilt angle and the image position of the reference point 21 formed in one of the frames to compute the pointing coordinate of the handheld device 10 relative to the display apparatus 20. The processing unit 13 generates the cursor parameter for controlling the display position of the cursor 23 according to the pointing coordinate computed. The processing unit 13 then drives the communication unit 16 to wirelessly transmit the cursor parameter to the display apparatus 20.

Algorithms used by the processing unit 13 for calculating the tilt angle (i.e., the first tilt angle, and the second tilt angle) of the handheld device 10 will be briefly described in the following paragraphs.

In one embodiment, the plurality frames generated by the image capturing unit 11 are rectangular-shape. The long side of a frame is configured to be parallel to the X-axis, and the short side of the frame is configured to be parallel to the Y-axis. When the processing unit 13 determines that the reference point 21 has not substantially moved, the processing unit 13 reads the accelerations Vx, Vy, and Vz of the handheld device 10 over the X-axis, Y-axis, and Z-axis of the three dimensional space depicted in FIG. 1 detected by the accelerometer unit 12. The accelerometer unit 12 operatively generates an acceleration vector V according to the detection result, and generates an acceleration sensing signal, accordingly. The acceleration sensing signal represents the ratio of any two accelerations, such as the ratio of the acceleration Vx to the acceleration Vy. The processing unit 13 computes the instant tilt angle of the handheld device 10 according to the acceleration sensing signal received.

Specifically, the processing unit 13 can compute the acceleration vector $\vec{V}$ and the included angles between any two of axes by using the following Eqs. (1) to (3) and obtain the instant tilt angle of the handheld device 10, $$\sin\theta_x = \frac{|Vx|}{|gxy|} \quad (1)$$

$$\cos\theta_y = \frac{|Vy|}{|gxy|} \quad (2)$$

$$|gxy| = \sqrt{Vx^2 + Vy^2}, \quad (3)$$

wherein Vx represents the acceleration of the handheld device 10 over the X-axis detected by the accelerometer unit 12; Vy represents the acceleration of the handheld device 10 over the Y-axis detected by the accelerometer unit 12; |gxy| represents the gravitational acceleration computed according to the acceleration Vx and the acceleration Vy.

The processing unit 13 subsequently corrects the orientation of the frames based on the computation result of Eq. (1) and Eq. (2) using Eq. (4), so that the coordinate system of the frame corrected is the same as the coordinate system of the display apparatus 20, $$\begin{bmatrix} x' \\ y' \end{bmatrix} = \begin{bmatrix} \cos(\theta) & -\sin(\theta) \\ \sin(\theta) & \cos(\theta) \end{bmatrix} \begin{bmatrix} x \\ y \end{bmatrix}, \quad (4)$$

wherein x represents the X-axis coordinate of the image position of the reference point 21 formed in one of the frames; y represents the Y-axis coordinate of the image position of the reference point 21 formed in one of the frames; x' represents the X-axis coordinate of the image position of the reference point 21 formed in one of the frames after orientation correction; y' represents the adjusted Y-axis coordinate of the image position of the reference point 21 formed in one of the frames after orientation correction. The processing unit 13 further computes the pointing coordinate of the handheld device 10 relative to the reference point 21 or the display apparatus 20 according to X-axis coordinate x' and Y-axis coordinate y' obtained after orientation correction.

Next, the processing unit 13 computes the cursor position according to the pointing coordinate computed, so as to generate the cursor parameter to correspondingly control the movement of the cursor 23 on the display apparatus 20. The processing unit 13 wirelessly transmits the cursor parameter or the relative movement information of the handheld device 10 to the display apparatus 20 via the communication unit 16 to correspondingly control the display position of the cursor 23 on the display apparatus 20.

It worth noting that those skilled in the art should understand that the accelerometer unit 12 of the handheld device 10 in the present disclosure can also be configured to only detect accelerations over two dimensions, such as the acceleration Vx and the acceleration Vy. The above described acceleration determination method for the handheld device 10 is only an implementation and does not limit the scope of the present disclosure. Additionally, computing the pointing coordinate of the handheld device 10 relative to the display apparatus 20 according to the image position of one or more reference point formed in frames captured is known technique in the art and is not the focus of the present disclosure, thus further descriptions are hereby omitted.

The input unit 14 is configured to enable a user of the handheld device 10 configuring the frame capturing rate and the calibration parameters, which includes but not limited to the calibration time, the number of calibrations, and the amount of compensation in each calibration. For instance, the user of the handheld device 10 may set the frame capturing rate according to a preset calibration time and configure the number of calibrations according to the predetermined frame capturing rate. For another instance, the user may also determine and set the number of calibrations based on the frame capturing rate configured. The frame capturing rate may be configured according to the frame refresh rate of the display apparatus 20.

The input unit 14 is configured to cause the display apparatus 20 to display a configuration or setting interface provided for the user to configure the calibration time, the frame capturing rate and/or the number of calibrations for correcting the cursor position. In practice, the input unit 14 may be implemented by a keypad interface, an optical finger navigation component, or a button and the present disclosure is not limited thereto. In one embodiment, where the handheld device 10 has a display screen (not shown), and the display screen can be configured to show the calibration time, the frame capturing rate, the number of calibrations for correcting the cursor position, and the amount of compensation applied in each calibration. The display screen of the handheld device 10 may be a touch screen.

The memory unit 15 can be configured to store operation parameters of the handheld device 10 including but not limited to the first pointing coordinate, the second pointing coordinate, the third pointing coordinate, the first tilt angle, the second tilt angle, the first predetermined threshold, the preset angle, and the cursor parameter. The memory unit 15 can be also configured to store the calibration time, the frame capturing rate and the number of calibrations for the cursor according to the operation of the handheld device 10.

The processing unit 13 in the instant embodiment can be implemented by a processing chip such as a microcontroller or an embedded controller programmed with necessary firmware, however the present disclosure is not limited to the example provided herein. The memory unit 15 can be implemented by a volatile memory chip or a nonvolatile memory chip including but not limited to a flash memory chip, a read-only memory chip, or a random access memory chip. The communication unit 16 can be configured to utilize Bluetooth technology and transmit the relative movement information to the display apparatus 20, but the present disclosure is not limited thereto It should be note that the internal components of the handheld device 10 may be added, removed, adjusted or replaced according to the functional requirements or design requirements and the present disclosure is not limited thereto. That is, the exact type, exact structure and/or implementation method associated with the image capturing unit 11, the accelerometer unit 12, the processing unit 13, the input unit 14, the memory unit 15, and the communication unit 16 may depend upon the practical structure and the exact implementation method adopted for the handheld device 10 and the present disclosure is not limited thereto.

Figure 3:
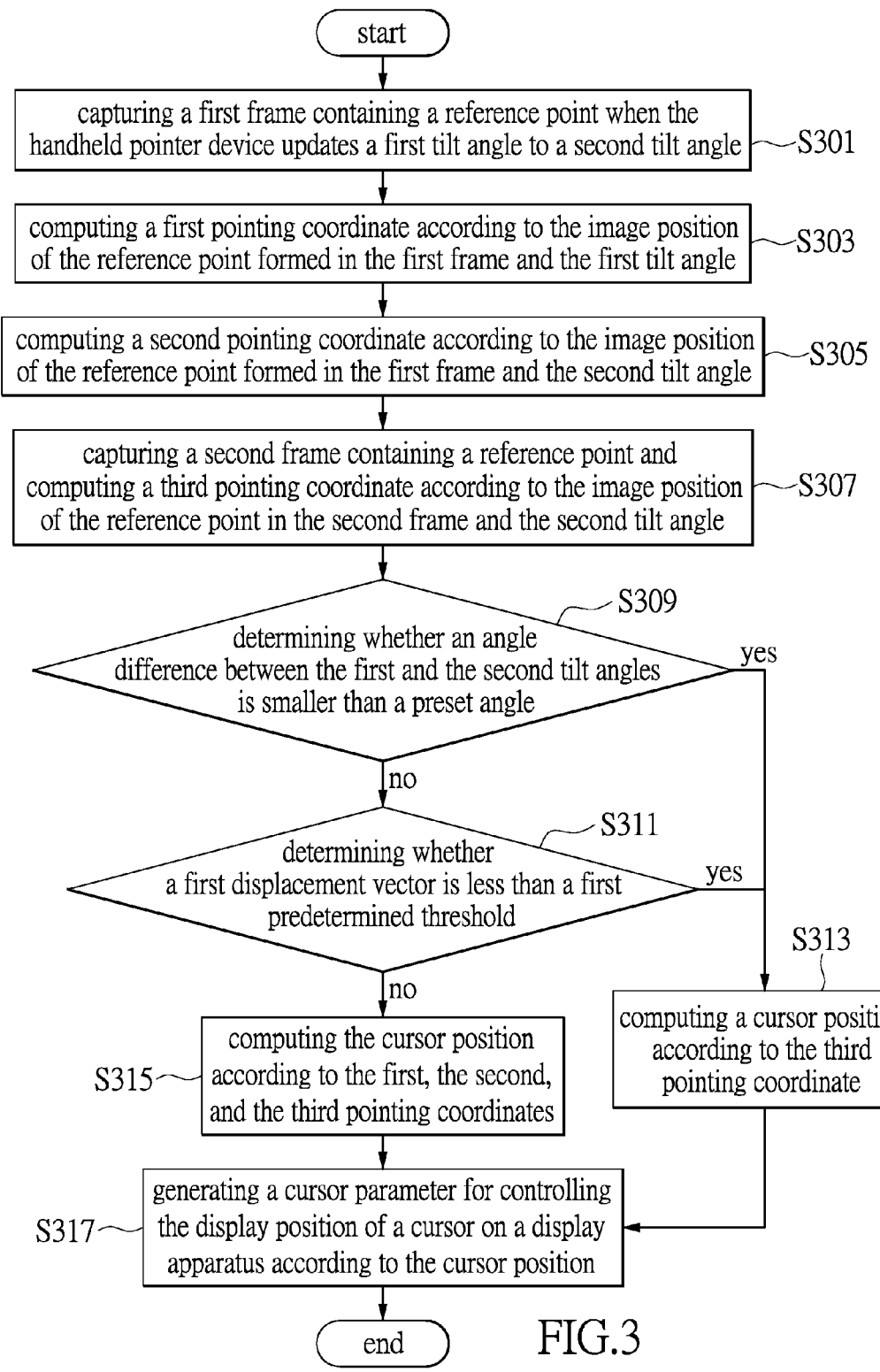
FIG. 3 is a flowchart diagram illustrating a positioning method of a handheld device provided in accordance to an exemplary embodiment of the present disclosure.
Figure 4A:
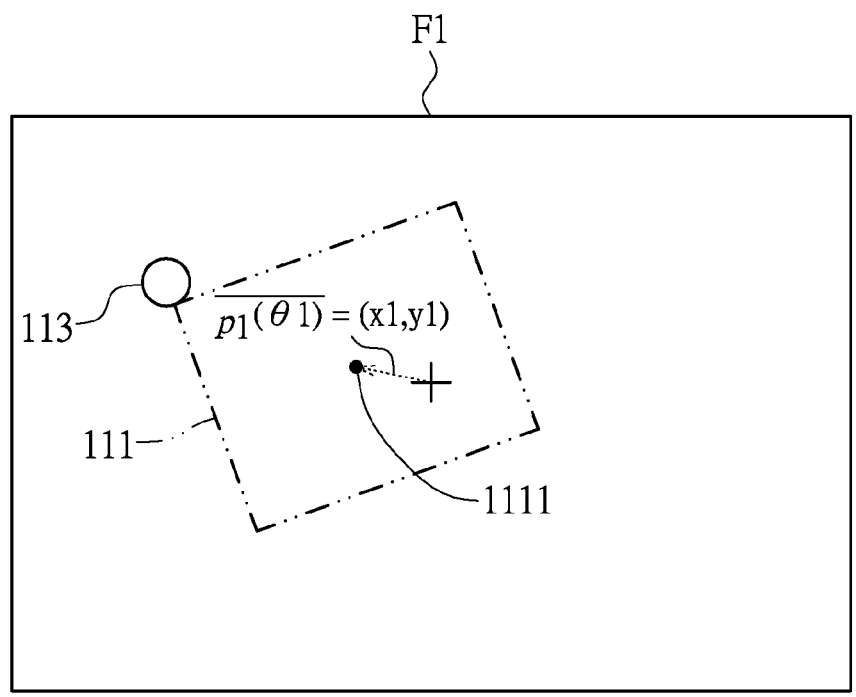
FIG. 4A~4B are diagrams respectively illustrating image positions of the reference point detected as the handheld device moves provided in accordance to an exemplary embodiment of the present disclosure.
Figure 4B:
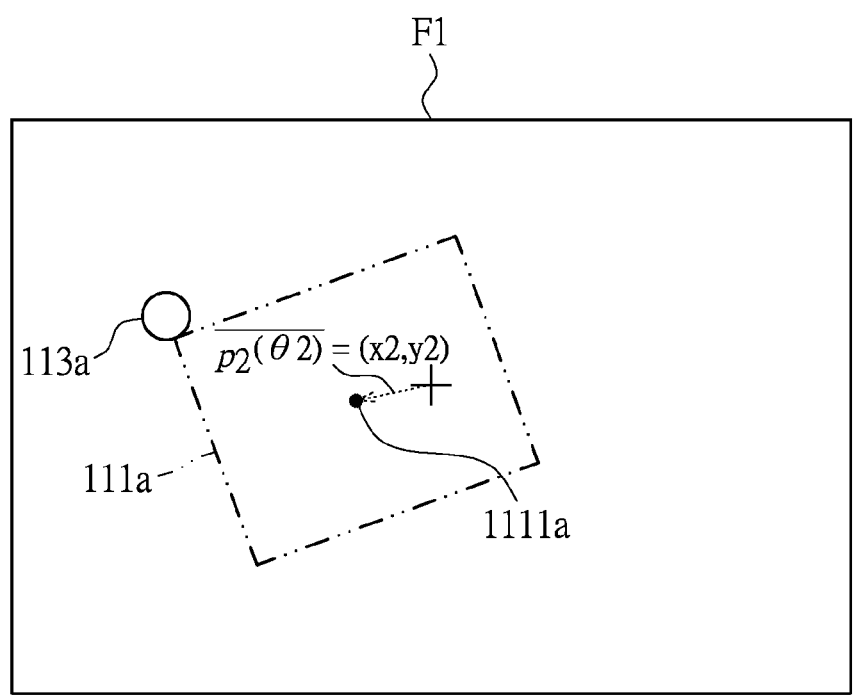
Figure 4C:
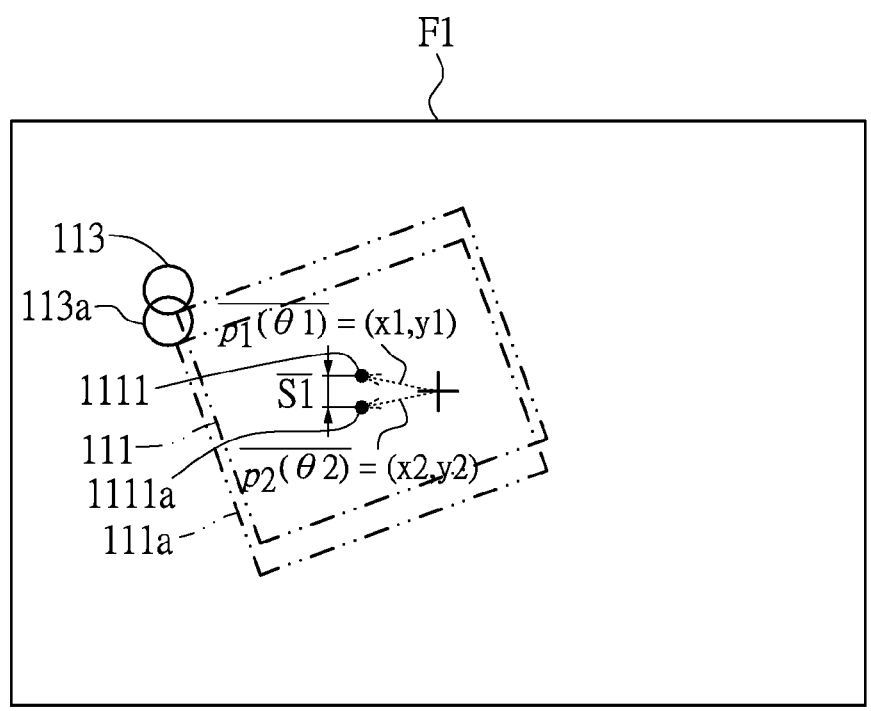
FIG. 4C is a diagram illustrating the image positions of the reference point computed using different tilt angle provided in accordance to an exemplary embodiment of the present disclosure.
Figure 4D:
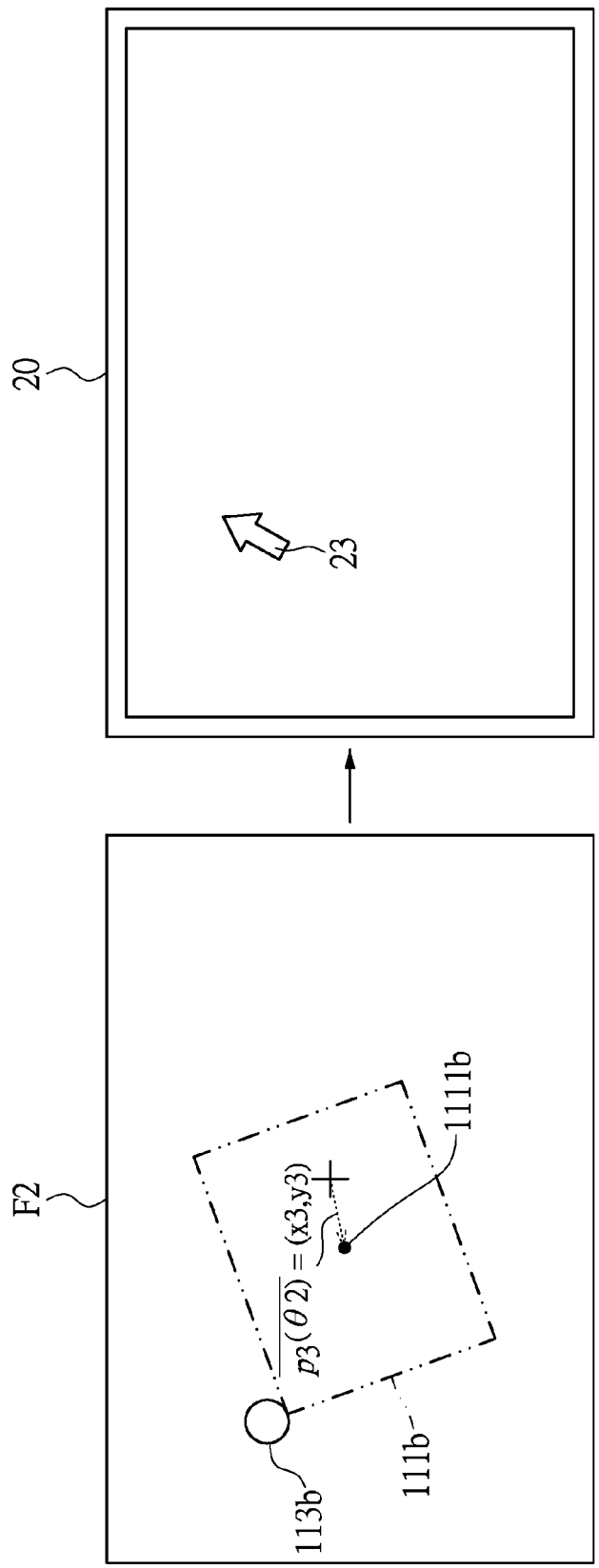
FIG. 4D is a diagram illustrating the image position of the reference point detected as the handheld device moves and the correspondingly movement of the cursor displayed on a display apparatus provided in accordance to an exemplary embodiment of the present disclosure.

The instant embodiment further provides a pointer positioning method for the handheld device 10 to illustrate the operation of the handheld device 10 in more detail. Please refer to FIG. 3 in conjunction with FIG. 1, 2, and FIG. 4A~FIG. 4D. FIG. 3 shows a flowchart diagram illustrating a pointer positioning method of a handheld device provided in accordance to an exemplary embodiment of the present disclosure. FIG. 4A~4B are diagrams respectively illustrating image positions of the reference point detected as the handheld device moves provided in accordance to an exemplary embodiment of the present disclosure. FIG. 4C shows a diagram illustrating the image positions of the reference point computed using different tilt angle provided in accordance to an exemplary embodiment of the present disclosure. FIG. 4D shows a diagram illustrating the image position of the reference point detected as the handheld device moves and the correspondingly movement of the cursor displayed on a display apparatus provided in accordance to an exemplary embodiment of the present disclosure.

Initially, in Step S301, when the processing unit 13 of the handheld device updates the first tilt angle θ1 presently used to the second tilt angle θ2, the processing unit 13 drives the image capturing unit 11 to capture and generate the first frame F1 containing the reference point 21.

It should be noted that the processing unit 13 can operatively determine whether to update the first tilt angle θ1 presently used in the cursor position computation to the second tilt angle θ2 by determining whether the image position of the reference point 21 formed corresponding to the position of the reference point 21 in the multiple consecutive images captured by the image capturing unit 11 has substantially moved.

Specifically, the processing unit 13 can operatively determine whether to update the first tilt angle θ1 presently used in cursor position computation to the second tilt angle θ2 according to frames containing the reference point 21 captured and generated by the image capturing unit 11.

In one embodiment, the processing unit 13 operatively updates the first tilt angle θ1 presently used in the cursor position computation to the second tilt angle θ2 upon determining that the position displacement of the image position of the reference point 21 formed in any two consecutive frames is less than a predefined displacement threshold (e.g., 1 pixel). In another embodiment, the processing unit 13 operatively updates the first tilt angle θ1 presently used in the cursor position computation to the second tilt angle θ2, upon determining that the velocity of the image position of the reference point 21 formed in the any two consecutive frames is less than a predefined velocity threshold (e.g., 1 pixel per unit time). In further another embodiment, the processing unit 13 may operatively update the first tilt angle θ1 presently used in cursor position computation to the second tilt angle θ2, upon determining that the magnitude of the acceleration vector of the handheld device 10 is equal to the gravitational acceleration (g) of the handheld device 10, wherein the acceleration vector is generated based on accelerations of the handheld device 10 over multiple axes detected.

In other words, the processing unit 13 operatively reads accelerations of the handheld device 10 over multiple axes e.g., X-axis, Y-axis, and Z-axis) detected by the accelerometer unit 12 and correspondingly updates the first tilt angle θ1 presently used to the second tilt angle θ2 computed upon determining that the position of the reference point 21 sensed has not substantially moved (i.e., the handheld device 10 is at rest).

In Step S303, the processing unit 13 computes the first pointing coordinate $\overline{p_1(\theta1)}$ based on the image position of the reference point 21 formed in the first frame F1 and the first tilt angle θ1. As shown in FIG. 4A, the first pointing coordinate $\overline{p_1(\theta1)}$ represents the pointing vector of the handheld device 10 relative to the display apparatus 20 in the first frame F1. The first pointing coordinate $\overline{p_1(\theta1)}$ is represented by (x1, y1).

The processing unit 13 further computes the cursor position of the cursor 23 according to the first pointing coordinate $\overline{p_1(\theta1)}$, so as to correspondingly generate the cursor parameter controlling the display position of the cursor 23 on the display apparatus 20. Subsequently, the processing unit 13 drives the communication unit 16 to wirelessly transmit the cursor parameter to the display apparatus 20 for correspondingly controlling the display position of the cursor 23 on the display apparatus 20.

Incidentally, the computation of first pointing coordinate $\overline{p_1(\theta1)}$ is described as follow. The processing unit 13 first defines an operating area 111 on the first frame F1 that corresponds to the display apparatus 20 according to the center point "+" of the first frames F1 and the image position of the reference point image 113 formed in the first frames F1. The operating area 111 corresponds to the screen of the display apparatus 20 and is scaled with a predetermined display ratio. The processing unit 13 defines the operating area 111 in the first frame F1 by using the image position of the reference point image 113 as the origin and scaled with the predetermined display ratio. The processing unit 13 further defines the center 1111 of the operating area 111 in the first frame F1. As such, the processing unit 13 may set the center 1111 of the operating area 111 as the origin, apply Eqs (1)~(4) along with the first tilt angle θ1, and compute the pointing vector of the center point "+" of the first frame F1 in the operating area 111 to obtain the first pointing coordinate $\overline{p_1(\theta1)}$.

It is worth to note that it is not necessary to define the center 1111 of the operating area to obtain the first pointing coordinate $\overline{p_1(\theta1)}$, the processing unit 13 may also obtain the first pointing coordinate $\overline{p_1(\theta1)}$ by computing the rotation angle of the handheld device 10. The rotation angle of the handheld device 10 is computed directly according to relationship between the center point "+" of the first frames F1 and the image position of the reference point image 113 in the first frames F1 or the image feature of the reference point image 113.

The center point "+" in the instant embodiment represents the center of the image sensing array of the image capturing unit 11. Alternatively, the first pointing coordinate $\overline{p_1}$ represents the pointing vector of the center of the image sensing array of the image capturing unit 11 (i.e., the center point "+") in the first frame F1 with respect to the coordinate system of the display apparatus 20 defined therein.

In Step S305, the processing unit 13 computes the second pointing coordinate $\overline{p2(\theta2)}$ based on the image position of the reference point 21 formed in the first frame F1 and the second tilt angle θ2.

As shown in FIG. 4B, the second pointing coordinate $\overline{p2(\theta2)}$ represents the pointing vector computed by mapping the center of the image sensing array of the image capturing unit 11 (i.e., the center point "+") onto the operating area 111a which corresponds to the screen of the display apparatus 20 defined in the first frame F1. The second pointing coordinate $\overline{p2(\theta2)}$ is represented by (x2, y2). The processing unit 13 uses the center 1111a of the operating area 111a as the origin and correspondingly computes the pointing vector of the center point"+" of the first frame F1 in the operating area 111a so as to obtain the second pointing coordinate $\overline{p2(\theta2)}$ and the second tilt angle θ2. The operating area 111a is defined based on the position of the reference point image 113a.

As shown in FIG. 4C, the processing unit 13 subsequently computes the first displacement vector $\overline{S1}$ associated with the pointing coordinate computed for the same frame after the tilt angle adjustment using the first pointing coordinate $\overline{p_1(\theta1)}$ and the second pointing coordinate $\overline{p2(\theta2)}$. The processing unit 13 then stores the first displacement vector $\overline{S1}$ in the memory unit 15.

In Step S307, the processing unit 13 drives the image capturing unit 11 to capture and generate the second frame F2 containing the reference point 21. The processing unit 13 computes the third pointing coordinate $\overline{p_3(\theta2)}$ based on the image position of the reference point 21 formed in the second frame F2 and the second tilt angle θ2. The second frame F2 is captured at a later time than the first frames F1. As shown in FIG. 4D, the third pointing coordinate $\overline{p_3(\theta2)}$ represents the pointing vector computed by mapping the center of the image sensing array of the image capturing unit 11 (i.e., the center point "+") onto the operating area 111b which corresponds to the screen of the display apparatus 20 defined in the second frame F2. The second pointing coordinate $\overline{p_3(\theta2)}$ is represented by (x3, y3). The operating area 111b is defined based on the reference point image 113b.

Subsequently, in Step S309, the processing unit 13 determines whether an angle difference ed between the first tilt angle θ1 and the second tilt angle θ2 is smaller than a preset angle (e.g., 20 degrees). When the processing unit 13 determines that the angle difference ed is smaller than the preset angle, the processing unit 13 executes Step S313; otherwise, the processing unit 13 executes Step S311.

In Step S311, the processing unit 13 determines whether a first displacement vector $\overline{S1}$ between the first pointing coordinate $\overline{p_1(\theta1)}$ and the second pointing coordinate $\overline{p2(\theta2)}$ is less than a first predetermined threshold (e.g., 10 pixels). When the processing unit 13 determines that the first displacement vector $\overline{S1}$ is less than the first predetermined threshold (e.g., 10 pixels), the processing unit 13 executes Step S313; otherwise, the processing unit 13 executes Step S315. The first predetermined threshold can be configured according to the preset angle, e.g., set to a pixel value that corresponds to the angle difference of 20 degree.

In Step S313, the processing unit 13 computes the cursor position directly according to the third pointing coordinate $\overline{p_3(\theta2)}$. That is to say, when the processing unit 13 determines that both the angle difference θd is smaller than the preset angle and the first displacement vector $\overline{S1}$ is less than the first predetermined threshold, the processing unit 13 does not compensate the third pointing coordinate $\overline{p_3(\theta2)}$, instead, the processing unit 13 directly computes the cursor position according to the third pointing coordinate $\overline{p_3(\theta2)}$.

In Step S315, the processing unit 13 computes the cursor position according to the first pointing coordinate $\overline{p_1(\theta1)}$, the second pointing coordinate $\overline{p2(\theta2)}$, and the third pointing coordinate $\overline{p_3(\theta2)}$. Particularly, the processing unit 13 first computes a compensated third pointing coordinate $\overline{p_3'(\theta2)}$ according to the third pointing coordinate $\overline{p_3(\theta2)}$ and the first displacement vector $\overline{S1}$. Afterward, the processing unit 13 computes the cursor position according to the compensated third pointing coordinate $\overline{p_3'(\theta2)}$ for compensating the offset between the first pointing coordinate $\overline{p_1(\theta1)}$ and the second pointing coordinate $\overline{p2(\theta2)}$.

The compensated third pointing coordinate $\overline{p_3'(\theta2)}$ can be computed using Eq. (5)

$$\overline{p_3'(\theta2)} = \overline{p_3(\theta2)} - S1 \qquad (5)$$

, wherein, $\overline{p_3'(\theta2)}$ represents the compensated third pointing coordinate; $\overline{p_3(\theta2)}$ represents the third pointing coordinate; $\overline{S1}$ represents the first displacement vector.

In Step S317, the processing unit 13 generates the cursor parameter for correspondingly controlling the movement of the cursor 23 based on the computation result from either Step S313 or Step S315. The processing unit 13 subsequently drives the communication unit 16 to wirelessly transmit the cursor parameter to the display apparatus 20 to correspondingly control the movement (i.e., the display position) of the cursor 23 on the display apparatus 20

It worth to note that as shown in FIG. 4D, since the third pointing coordinate $\overline{p_3(\theta2)}$ lies within the operating area 111 of the first image frame F1, the display apparatus 20 will correspondingly display the cursor 23 on the display area of the screen shown thereon according to a display aspect ratio configured for the display apparatus 20 upon receiving the cursor parameter. Specifically, when the handheld device 10 transmits the cursor parameter for controlling the display position of the cursor 23 along with the predetermined display ratio to the display apparatus 20 with the communication unit 16, the display apparatus 20 operatively computes the display position of the cursor 23 and correspondingly positions the cursor 23 on the screen shown by the display apparatus 20 according to the current display aspect ratio (i.e., the resolution of the display apparatus 20). Those skilled in the art should be able to infer the method of computing the display position of the cursor 23 on the screen shown by the display apparatus 20 according to the current display aspect ratio and the cursor parameter, hence further descriptions are hereby omitted.

It is worth to mention that as shown in FIG. 4A~FIG 4C, the reference point images 113, 113a, and 113b in the instant disclosure are respectively represents by a circle, however the reference point images 113, 113a, and 113b may also be represented by a cross-shaped or a star shaped symbol. The present disclosure is not limited to the example illustrated in FIG. 4A~FIG 4C. Additionally, if the interactive system of FIG. 2 utilizes two or more reference points 21, then the image positions of the reference point images 113, 113a and 113b formed in the frames can be configured to be the average-coordinate between/among the reference point images identified. Moreover, the processing unit 13 further can compensate the computation of the image positions of the reference point images according to the preset image-forming parameters and the preset image-forming distance, so as to accurately determine the position of the reference point image. Those skilled in the art should be able to know the configuration of the preset image-forming parameters and the image forming distance as well as apply compensation to the image positions of the reference point images 113, 113a, and 113b in the frame computed using the preset image-forming parameters and the image forming distance, and further details are hereby omitted.

Figure 5:
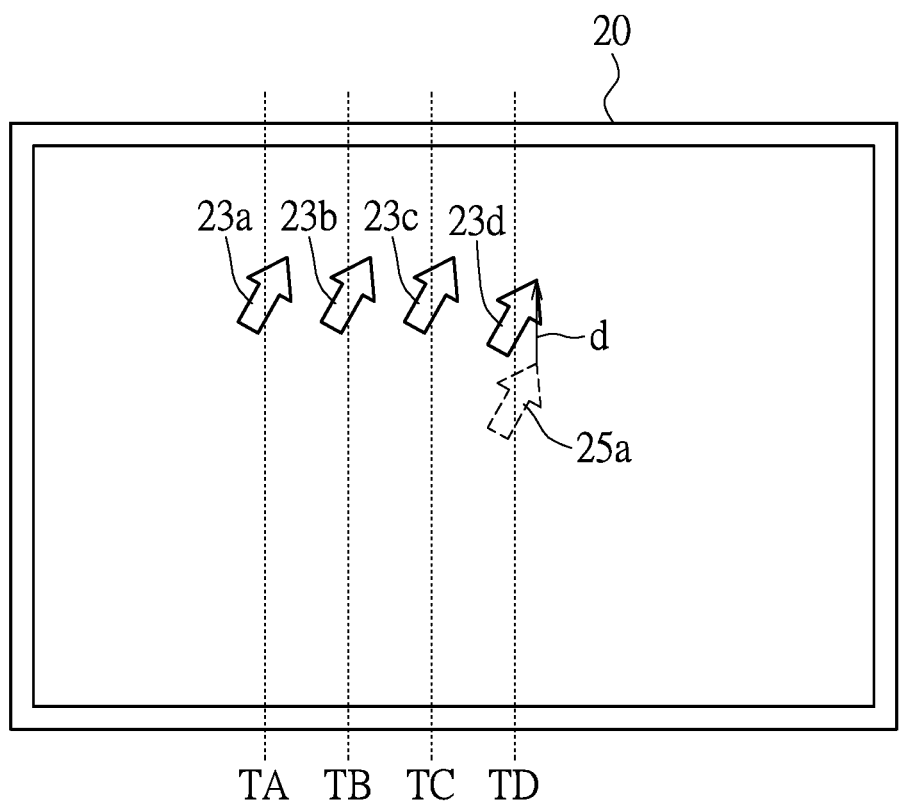
FIG. 5 is a diagram illustrating the movement of the cursor displayed on a display apparatus provided in accordance to an exemplary embodiment of the present disclosure.

Please refer to FIG. 5 in conjunction with FIG. 1 for clearly understandings over the operation of the pointer position method for the handheld device 10. FIG. 5 shows a diagram illustrating the movement of the cursor displayed on the display apparatus 20 provided in accordance to an exemplary embodiment of the present disclosure.

The display position of the cursor 23a corresponds to the pointing coordinate computed by the handheld device 10 at time TA using the first tilt angle θ1. The display position of the cursor 23b corresponds to the pointing coordinate computed by the handheld device 10 at time TB using the first tilt angle θ1. The display position of the cursor 23c corresponds to the pointing coordinate computed by the handheld device 10 at time TC using the first tilt angle θ1. At time TC, the handheld device 10 updates the first tilt angle θ1 to the second tilt angle θ2. The handheld device 10, at same time computes the first pointing coordinate $\overline{p_1(\theta 1)}$ and the second pointer coordinate $\overline{p_2(\theta 2)}$ using the first tilt angle θ1 and the second tilt angle θ2, respectively to obtain the first displacement vector $\overline{S1}$. The display position of the cursor 23d corresponds to the compensated third pointing coordinate $\overline{p_3'(\theta 2)}$ computed by the handheld device 10 at time TD according to the first displacement vector $\overline{S1}$ and the second tilt angle θ2. The display position of the cursor 25a corresponds to the pointing coordinate directly computed by the handheld device 10 at time TC using the second tilt angle θ2 without any compensation. That is, when no compensation is applied to the pointing coordinate computed after the handheld device 10 updated the tilt angle used, the display position of the cursor will be at the position corresponds to the cursor 25a. More specifically, as shown in FIG. 5, the display position of cursor 23c will suddenly jump to the display position of cursor 25a when no compensation is applied to pointing coordinate after tilt angle adjustment, which degrades the user's operability.

Therefore, by gradually compensating pointing coordinates computed after tilt angle update according to the displacement generated after tilt angle update using the method described in the instant embodiment during the cursor position computation, and positioning the cursor at the display position of the cursor 23d, which is a distance d from the display position of the cursor 25a without calibration and compensation, effectively resolves the cursor jumping issue.

In short, the handheld device 10 of the instant embodiment is operable to determine whether or not to compensate the pointing coordinates after updated the first tilt angle θ1 to the second tilt angle θ2 (e.g., whether cursor jumping issue is noticeable to the user). Moreover, when the handheld device 10 determines to compensate the pointing coordinates computed after tilt angle update, the handheld device 10 compensates the pointing coordinates according to the displacement generated after the handheld device 10 updates the first tilt angle θ1 to the second tilt angle θ2.

To increase the cursor control precision and improve the user's operability, the instant embodiment further provides a cursor position calibration algorithm. The cursor position calibration algorithm can cause the cursor controlled to translate smoothly from the current moving path to the movement path that corresponds to the actual movement path of the handheld device 10 after the tilt angle update within a preset calibration time or preset number of calibration. Such that the occurrence of the cursor jumping from one place to another can be prevented while and the directivity of the handheld device 10 can be maintained.

Figure 6:
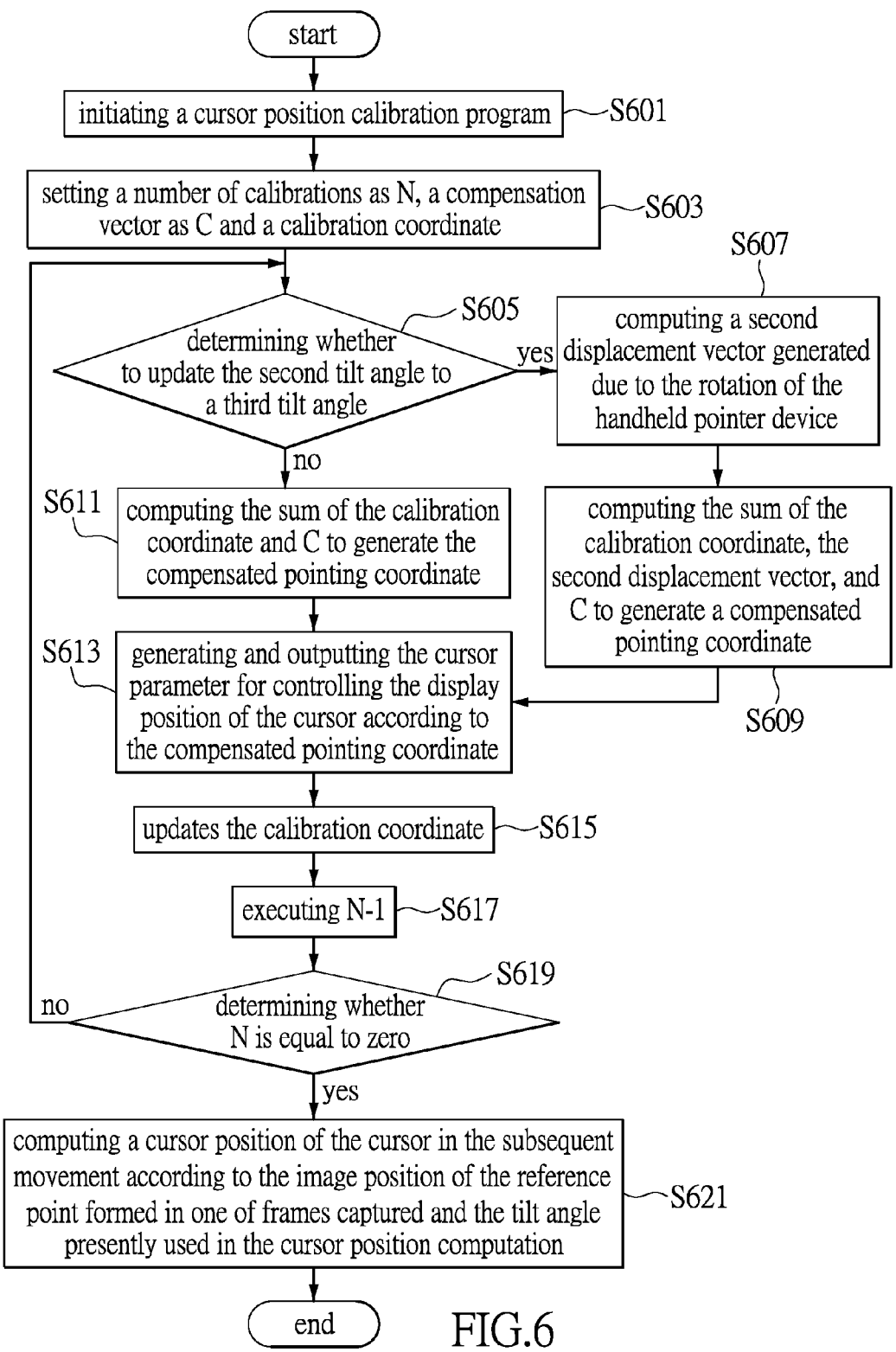
FIG. 6 is a flowchart diagram illustrating a method for calibrating the cursor position after the update of tilt angle provided in accordance to an exemplary embodiment of the present disclosure.
Figure 7:
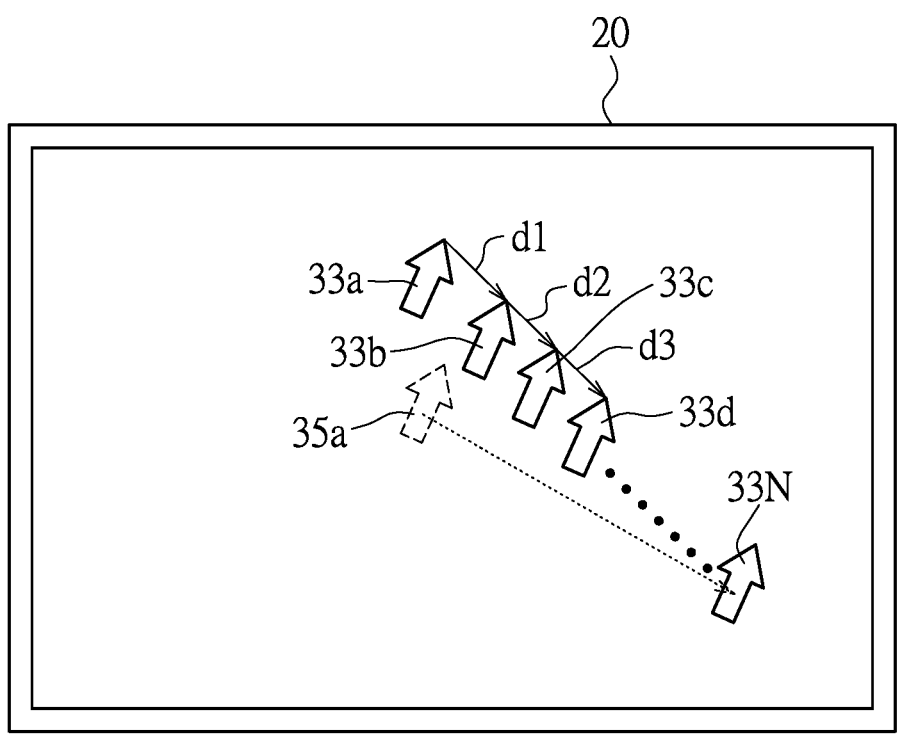
FIG. 7 is a diagram illustrating the movement of the cursor displayed on a display apparatus along with the movement of a handheld device provided in accordance to an exemplary embodiment of the present disclosure.

Details on the implementation of the cursor position calibration algorithm are provided in the following paragraphs. Please refer to FIG. 6 and FIG. 7 in conjunction with FIG. 2. FIG. 6 shows a flowchart diagram illustrating a method for calibrating the cursor position after the tilt angle update provided in accordance to an exemplary embodiment of the present disclosure. FIG. 7 shows a diagram illustrating the movement of the cursor displayed on the display apparatus along with the movement of a handheld device provided in accordance to an exemplary embodiment of the present disclosure.

In Step S601, when the processing unit 13 updates the first tilt angle θ1 to the second tilt angle θ2, the processing unit 13 initiates a cursor position calibration program and causes the handheld device 10 to operate in a cursor calibration mode.

In Step S603, the processing unit 13 sets the number of calibrations as N, a compensation vector as C and a calibration coordinate $\overline{p_c}$. The calibration coordinate $\overline{p_c}$ herein is the pointing coordinate that requires compensation, such as the third pointing coordinate $\overline{p_3(\theta 2)}$ computed based on the image position of the reference point in the second frame F2 and the second tilt angle θ2. The processing unit 13 stores N, C, and the calibration coordinate $\overline{p_c}$ in the memory unit 15.

More specifically, the processing unit 13 determines whether the first displacement vector $\overline{S1}$ is greater than a second predetermined threshold. When the processing unit 13 determines that the first displacement vector $\overline{S1}$ is greater than the second predetermined threshold, the processing unit 13 operatively sets N equal to the first displacement vector $\overline{S1}$ divided by C wherein C is a predetermined compensation value. On the contrary, when the processing unit 13 determines that the first displacement vector $\overline{S1}$ is less than the second predetermined threshold, the processing unit 13 operatively sets C equal to the first displacement vector $\overline{S1}$ divided by N wherein N is a predetermined number of calibrations.

It worth to note that the aforementioned first predetermined threshold and the second predetermined threshold may be configured to be the same or different depend upon the practical operational requirements of the handheld device 10 and/or the type of the software application executed on the display apparatus 20.

Briefly, when the first displacement vector $\overline{S1}$ is determined to be greater than the second predetermined threshold, indicates that the angle difference is relative large and requires a larger compensation vector, the processing unit 13 automatically selects the constant compensation method and gradually compensates pointing coordinates computed after tilt angle update to avoid the occurrence of cursor jumping negatively affecting the user operation. When determines that the first displacement vector $\overline{S1}$ is less than the second predetermined threshold, indicates that the angle difference is relative small, the processing unit 13 quickly compensates and corrects the pointing coordinates computed within the preset number of calibrations.

Particularly, when the processing unit 13 determines to compute C according to the first displacement vector $\overline{S1}$ and N, the processing unit 13 can use Eq. (6) to compute C, $$C = \frac{\overline{S1}}{N} = \frac{(\overline{p2(\theta 2)} - \overline{p1(\theta 1)})}{N}, \tag{6}$$

wherein C represents the compensation vector; $\overline{S1}$ represents the first displacement vector; $\overline{p_1(\theta1)}$ represents the first pointing coordinate; $\overline{p2(\theta2)}$ represents the second pointing coordinate; N represents the number of calibrations and N is a constant value. According to Eq. (6), the larger the N is, the smaller the C is per each calibration; the smaller the N is, the larger the C is per each calibration.

In one embodiment, the processing unit 13 may set N according to the frame capturing rate or the preset calibration time configured by the user via the input unit 14. For instance, when the user configures the handheld device 10 to complete the cursor position calibration program within 5 frames based on the frame capturing rate, the processing unit 13 sets N to be 5 and computes C according to N and the first displacement vector $\overline{S1}$. For another instance, when the user configures the preset calibration time to be 5 seconds (i.e., causes the handheld device 10 to complete the cursor position calibration program within 5 seconds) and configures the frame capturing rate to be 5 frames per second, the processing unit 13 operatively sets N to be 25 and computes C according to N and the first displacement vector $\overline{S1}$.

On the other hand, when the processing unit 13 determines to compute N according to the first displacement vector $\overline{S1}$ and C, the processing unit 13 can use Eq. (7) to compute N, $$N = \frac{\overline{S1}}{C} = \frac{(\overline{p2(\theta2)} - \overline{p1(\theta1)})}{C} \qquad (7)$$

wherein C represents the compensation vector and C is a constant value; $\overline{S1}$ represents the first displacement vector; $\overline{p_1(\theta1)}$ represents the first pointing coordinate; $\overline{p2(\theta2)}$ represents the second pointing coordinate; N represents the number of calibrations. According to Eq. (7), the larger the C is, the smaller the N is; the smaller the C is, the larger the N is.

In one embodiment, the processing unit 13 can configure C according to the resolution of the display apparatus 20 provided by the user via the input unit 14. For example, when the user configures the handheld device 10 to correct one-degree difference per each calibration in accordance to the resolution of the display apparatus 20, and each degree corresponds to three pixel, the processing unit 13 operatively sets C to be 3 and computes N according to C and the first displacement vector $\overline{S1}$.

The user of the handheld device 10 as described may also configure N and C based on the accuracy or precision needed by the software application executed on the display apparatus 20 through the user interface provided by the input unit 14.

In Step S605, the processing unit 13 determines whether to update the second tilt angle θ2 to a third tilt angle θ3. When the processing unit 13 determines to update the second tilt angle θ2 to the third tilt angle θ3, the processing unit 13 executes Step S607; otherwise, the processing unit 13 executes Step S611.

In Step S607, the processing unit 13 computes a second displacement vector $\overline{S2}$ generated due to the instant rotation of the handheld device 10. Specifically, the processing unit 13 drives the image capturing unit 11 to capture and generates a third frame F3. The processing unit 13 computes a fourth pointing coordinate $\overline{p_4(\theta2)}$ and a fifth pointing coordinate $\overline{p_5(\theta3)}$ using the second tilt angle θ2 and the third tilt angle θ3, respectively, in coordination with the image position of the reference point formed in the third frame F3. The processing unit 13 subsequently computes the second displacement vector $\overline{S2}$ according to the fourth pointing coordinate $\overline{p_4(\theta2)}$ and the fifth pointing coordinate $\overline{p_5(\theta3)}$. The third frame F3 is captured and generated at a later time than the second frame F2.

In other words, during the execution of cursor position calibration program, the processing unit 13 operatively determines whether the handheld device 10 has generated new rotation angle under user's operation, and correspondingly compensates the cursor position computed according to the displacement generated after updated the second tilt angle θ2 to the third tilt angle θ3, thereby improves the directivity of the handheld device 10 and at same time resolves the cursor jumping issue.

In Step S609, when the processing unit 13 determines that the second tilt angle θ2 has updated to the third tilt angle θ3, the processing unit 13 computes the sum of the calibration coordinate $\overline{p_c}$, the second displacement vector $\overline{S2}$, and C to generate a compensated pointing coordinate $\overline{p_N'}$, e.g., the compensated third pointing coordinate $\overline{p_3'(\theta2)}$. Particularly, the compensated pointing coordinate $\overline{p_N'}$ is computed using Eq. (8), $$\overline{p_{N'}} = \overline{p_c} + C = p_3(\theta2) + \frac{(p_2(\theta2) - p_1(\theta1) + (p_5(\theta3) - p_4(\theta2)))}{N}, \qquad (8)$$

wherein $\overline{p_N'}$ represents the compensated pointing coordinate; $\overline{p_c}$ represent calibration coordinate; C represents the compensation vector; $\overline{p_1(\theta1)}$ represents the first pointing coordinate; $\overline{p2(\theta2)}$ represents the second pointing coordinate; $\overline{p_3(\theta2)}$ represents the third pointing coordinate; $\overline{p_4(\theta2)}$ represents the fourth pointing coordinate; $\overline{p_5(\theta3)}$ represents the fifth pointing coordinate; N represents the number of calibrations.

In Step S611, when the processing unit 13 determines that second tilt angle θ2 has not been updated, i.e., no tilt angle update operation has been executed, the processing unit 13 computes the sum of the calibration coordinate $\overline{p_c}$ and C to generate the compensated pointing coordinate $\overline{p_N'}$, e.g., the compensated third pointing coordinate $\overline{p_3'(\theta2)}$. Particularly, the compensated pointing coordinate $\overline{p_N'}$ is computed using Eq. (9), $$\overline{p_{N'}} = \overline{p_c} + C = p_3(\theta2) + \frac{(p_2(\theta2) - p_1(\theta1))}{N}, \qquad (9)$$

wherein $\overline{p_N'}$ represents the compensated pointing coordinate; $\overline{p_c}$ represent calibration coordinate; C represents the compensation vector; $\overline{p_1(\theta1)}$ represents the first pointing coordinate; $\overline{p2(\theta2)}$ represents the second pointing coordinate; $\overline{p_3(\theta2)}$ represents the third pointing coordinate; N represents the number of calibrations.

In Step S613, the processing unit 13 generates and outputs the cursor parameter for controlling the display position of the cursor on the display apparatus 20 according to the compensated pointing coordinate $\overline{p_N'}$ computed. The processing unit 13 drives the communication unit 16 to output the cursor parameter to the display apparatus 20 and causes the cursor to smoothly translate a distance d1 to the target position (i.e., the display position of the cursor 33b shown in FIG. 7) from the current cursor position (i.e., the display position of the cursor 33a shown in FIG. 7). The display position of the cursor 33a corresponds to the pointing coordinate computed by the handheld device 10 using the first tilt angle θ1. The display position of the cursor 35*a* corresponds to the pointing coordinate computed by the handheld device 10 using the second tilt angle θ2.

In Step S615, the processing unit 13 sets the calibration coordinate $\overline{p_c}$ to be the newly computed pointing coordinate e.g., a sixth pointing coordinate. The sixth pointing coordinate is computed according to image position of the reference point formed in a forth frame F4 using the second tilt angle θ2 or the third tilt angle θ3 (e.g., when the handheld device 10 updated the second tilt angle θ2 to the third tilt angle θ3). In Step S617, the processing unit 13 executes N−1 (i.e. decrement the number of calibrations by one). The processing unit 13 stores the calibration coordinate $\overline{p_c}$ and the number of calibrations after decremented by one in the memory unit 15. In Step S619, the processing unit 13 determines whether N is equal to zero, i.e., whether the cursor position calibration program has been completed.

When the processing unit 13 determines that N is equal to zero, i.e., the cursor position calibration program has been completed, the processing unit 13 executes S621. Conversely, when the processing unit 13 determines that N is not equal to zero, i.e., the cursor position calibration program has not been completed, the processing unit 13 returns to Step S605. Specifically, the processing unit 13 drives the image capturing unit 11 to capture a fifth frame F5 and performs steps of computing a seventh pointing coordinate of the handheld device 10 relative to the reference point according to the image position of the reference point formed in the fifth frame F5 and the second tilt angle θ2 or the third tilt angle θ3, setting the seventh pointing coordinate as the calibration coordinate, and computing the compensated pointing coordinate based on the calibration coordinate and C. So that, the cursor displayed on the display apparatus 20 translates or moves a distance d2 from the display position of cursor 33*b* to the display position of cursor 33*c* as illustrated in FIG. 7.

Thereafter, the processing unit 13 re-executes Steps S605~S619 and sequentially captures N−2 frames (not shown) for continue to compensate the pointing coordinates computed and compute the cursor position accordingly, until N is equal to zero.

When the processing unit 13 completed the cursor position calibration program, as show in FIG. 7, the cursor displayed from the display apparatus 20 smoothly moves N times from the display position that corresponds to the first pointing coordinate $\overline{p_1(\theta 1)}$ (e.g., the display position of the cursor 33*a*) to the position currently pointed by the handheld device 10. More specifically, the cursor displayed on the display apparatus 20 is translated smoothly from the display position (i.e., the display position of the cursor 33*a*) that corresponds to the first pointing coordinate $\overline{p_1(\theta 1)}$ to the display position (i.e., the display position of the cursor 33N) that corresponds to the position currently pointed by the handheld device 10 relative to the display apparatus 20 in accordance to the distances d1, d2, d3, . . . , dn computed after the Nth frame In Step S621, the processing unit 13 computes the cursor position in the subsequent movement of the handheld device 10 according to the image position of the reference point formed in one of the frames captured along with the tilt angle presently used in cursor position computation, so as to improves the accuracy in cursor control operation.

It is worth to note that, whenever the handheld device 10 updated the tilt angle thereof during the cursor position calibration, the processing unit 13 accumulates the displacement generated and correspondingly adjusts the amount of compensation applied, i.e., adjusting C, for maintaining the directivity of the handheld device 10. The processing unit 13 further operatively determines whether to incorporate the displacement generated after tilt angle update into pointing coordinate compensation computation or not according to angle difference before and after the tilt angle update and/or the magnitude of the displacement vector generated after the tilt angle update.

Additionally, the processing unit 13 may also constantly communicate with the display apparatus 20 via the communication unit 16 during the operation of the handheld device 10, so as to obtain information associated with the software application executed on the display apparatus 20 including but not limited to the type and the execution progress of the software application, the frame refreshing rate, and the resolution required by the display apparatus 20 in the execution of the software application. The processing unit 13 can operatively determine whether or not to execute the cursor position calibration program as well as configuring the calibration parameters for the cursor position calibration program according to the information obtained from the display apparatus. The calibration parameters for the cursor position calibration program in the instant embodiment includes but not limited to the predetermined threshold (such as the first and the second predetermined thresholds), the preset angle, the number of calibrations, the calibration time, and the amount of compensation in each calibration.

In practice, the pointer positioning method of FIG. 3 and the method of calibrating the cursor position after the tilt angle update can be implemented by writing the corresponding program codes into the processing unit 13 (such as microcontroller or an embedded controller) via firmware design and executed by the processing unit 13 during the operation of the handheld device 10, however the present disclosure is not limited thereto.

FIG. 3 is merely used for illustrating a pointer positioning method for the handheld device 10, and the present disclosure is not limited thereto. Similarly, FIG. 6 is merely used for illustrating an implementation method of the cursor position calibration algorithm and shall not be used to limit the present disclosure. FIG. 4A~FIG 4D are merely used to illustrate the computation of pointing coordinates and the relationship between the operating area (i.e., the display area) of the display apparatus 20 and the center of the image sensing array of the image capturing unit 11 (i.e. the center pointer "+") and should not be used to limit the present disclosure. FIG. 5 and FIG. 7 are merely used to illustrate the operation of the handheld device 10 and the pointer positioning method in coordination with FIG. 3 and FIG. 5, respectively and the present disclosure is not limited thereto.

(Another Exemplary Embodiment of a Handheld Device)

Figure 8:
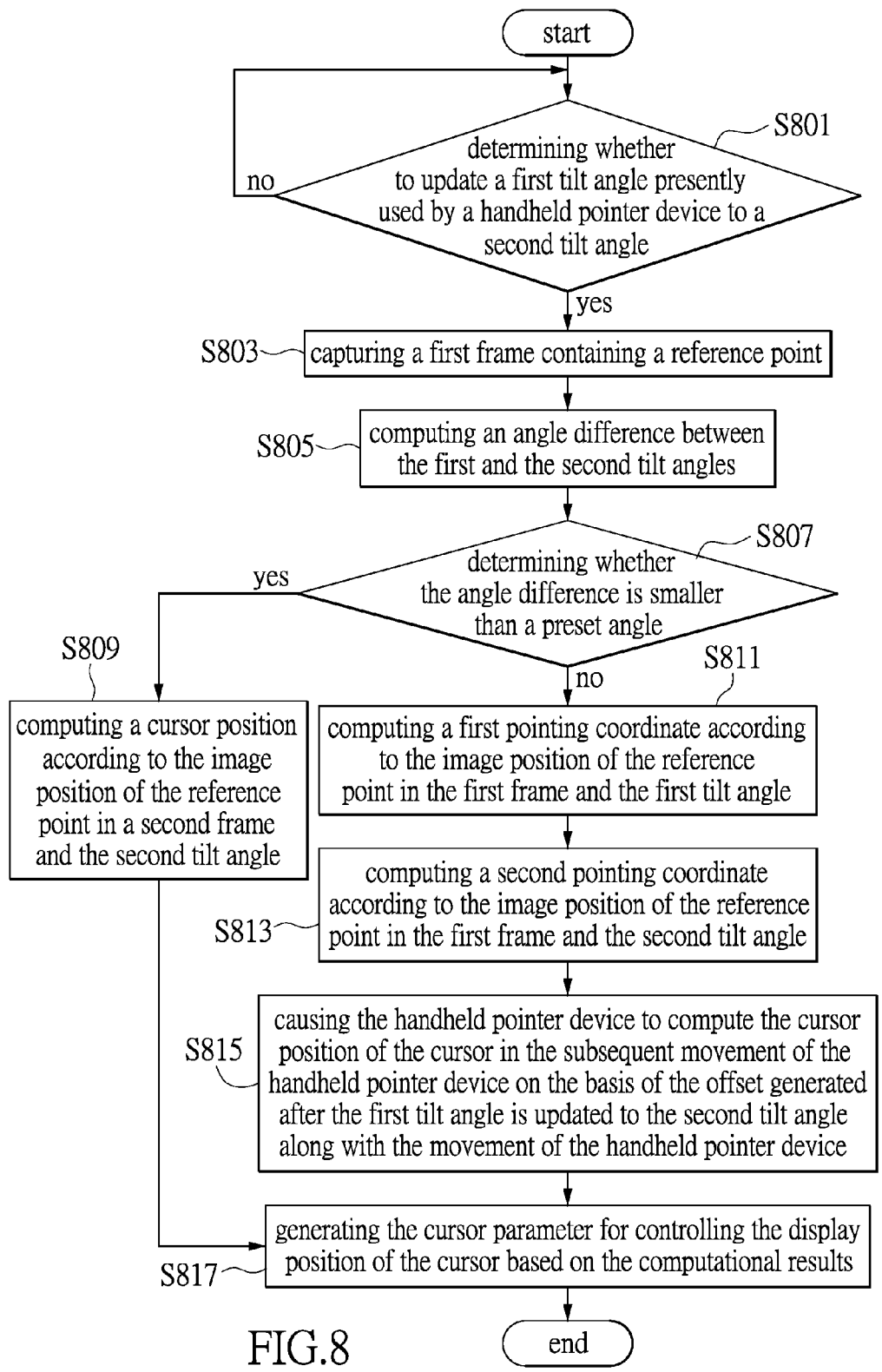
FIG. 8 is a flowchart diagram illustrating a positioning method of a handheld device provided in accordance to another exemplary embodiment of the present disclosure.

From the aforementioned exemplary embodiments, the present disclosure can generalize another pointer positioning method for the aforementioned handheld device of the interactive system. Please refer to FIG. 8 in conjunction with FIG. 1 and FIG. 2. FIG. 8 shows a flowchart diagram illustrating a pointer positioning method provided in accordance to another exemplary embodiment of the present disclosure. The pointer positioning method of FIG. 8 can be implemented by programming the processing unit 13 via firmware design and executed by the processing unit 13 during the operation of the handheld device 10.

In Step S801, the processing unit 13 of the handheld device 10 determines whether to update a first tilt angle presently used in the cursor position computation to a second tilt angle. When the processing unit 13 determined to update the first tilt angle presently used in the cursor position computation to a second tilt angle, the processing unit 13 executes Step S803; otherwise, the processing unit 13 returns to Step S801.

Specifically, the processing unit 13 operatively determines whether the reference point 21 has substantially moved according to a plurality of frames generated by the image capturing unit 21, wherein the image capturing unit 21 captures images corresponding to the position of the reference point 21 and sequentially generates the plurality of frames. The processing unit 13 of the handheld device 10 determines to update the first tilt angle to the second tilt angle upon determined that the reference point 21 has not substantially moved i.e., the handheld device 10 is at rest.

Incidentally, in other embodiment, the handheld device 10 may also determine whether to update the first tilt angle to the second tilt angle by determining whether the pointing coordinate computed based on the image position of the reference point 21 in frames captured has substantially moved. For instance, when the processing unit 13 of the handheld device 10 determines that pointing coordinate computed based on the position of the reference point 21 has not substantially moved, the processing unit 13 updates the first tilt angle presently used in the cursor position computation to the second tilt angle.

In Step S803, the processing unit 13 operatively drives the image capturing unit 11 to capture and generate a first frame containing the reference point 21 after the processing unit 13 updated the first tit angle presently used in the cursor position computation to the second tilt angle.

In Step S805, the processing unit 13 computes an angle difference between the first tilt angle and the second tilt angle.

In Step S807, the processing unit 13 determines whether the angle difference between the first tilt angle and the second tilt angle is smaller than a preset angle, e.g., 20 degrees. When the angle difference between the first tilt angle and the second tilt angle is computed to be smaller than the preset angle, the processing unit 13 executes Step S809; otherwise, the processing unit 13 executes Step S811.

In Step S809, the processing unit 13 drives the image capturing unit 11 to capture and generate a second frame containing the reference point 21. The second frame is captured and generated at a later time than the first frame. The processing unit 13 directly computes the cursor position of the cursor 23 based on the image position of the reference point formed in the second frame and the second tilt angle. That is to say, when the angle difference between the first tilt angle and the second tilt angle is computed to be smaller than the preset angle, e.g., 20 degrees, the processing unit 13 determines that the cursor jumping phenomenon is not noticeable to human eye and computes the cursor position of the cursor 23 directly based on the image position of the reference point formed in the second frame without applying any compensation.

In Step S811, the processing unit 13 computes a first pointing coordinate according to the image position of the reference point 21 formed in the first frame and the first tilt angle. In Step S813, the processing unit 13 computes a second pointing coordinate according to the image position of the reference point 21 formed in the first frame and the second tilt angle. The processing unit 13 stores the first and the second pointing coordinates in the memory unit 15. Algorithm used for computing the first and the second pointing coordinates are essentially the same as described in the aforementioned embodiment, and further descriptions are hereby omitted.

In Step S815, the processing unit 13 computes the cursor position of the cursor 23 in the subsequent movement of the handheld device 10 on the basis of the offset between the first pointing coordinate and the second pointing coordinate generated after the first tilt angle is updated to the second tilt angle along with the movement of the handheld device 10.

In Step S817, the processing unit 13 generates a cursor parameter for controlling the display position of the cursor 23 on the display apparatus 20 according to the computational result from either Step S809 or Step S815. The processing unit 13 drives the communication unit 16 to wirelessly transmit the cursor parameter to the display apparatus 20 for correspondingly controlling the display position of the cursor 23 on the display apparatus 20.

FIG. 8 is merely used for illustrating another pointer positioning method for the handheld device and the present disclosure is not limited thereto. Those skilled in art should be able to select the method for determining whether the handheld device 10 is at rest, such as by analyzing the displacement, the velocity, or the acceleration associated with the image position of the reference point 21 formed in a set of consecutive frames captured, or by analyzing displacement information at least two pointing coordinates which is computed based on the image position of the reference point in a set of consecutive frames captured, or by analyzing the magnitude of an acceleration vector generated based on multiple accelerations of the handheld device 10 detected over multiple axes, so as to determine whether to cause the handheld device to update the first tilt angle to the second tilt angle according to practical operation requirements of the handheld device 10. Moreover, the method for calibrating the cursor position after the tilt angle update described in the aforementioned embodiment can be executed during the execution of Step S815.

(Another Exemplary Embodiment of a Handheld Device)

Figure 9:
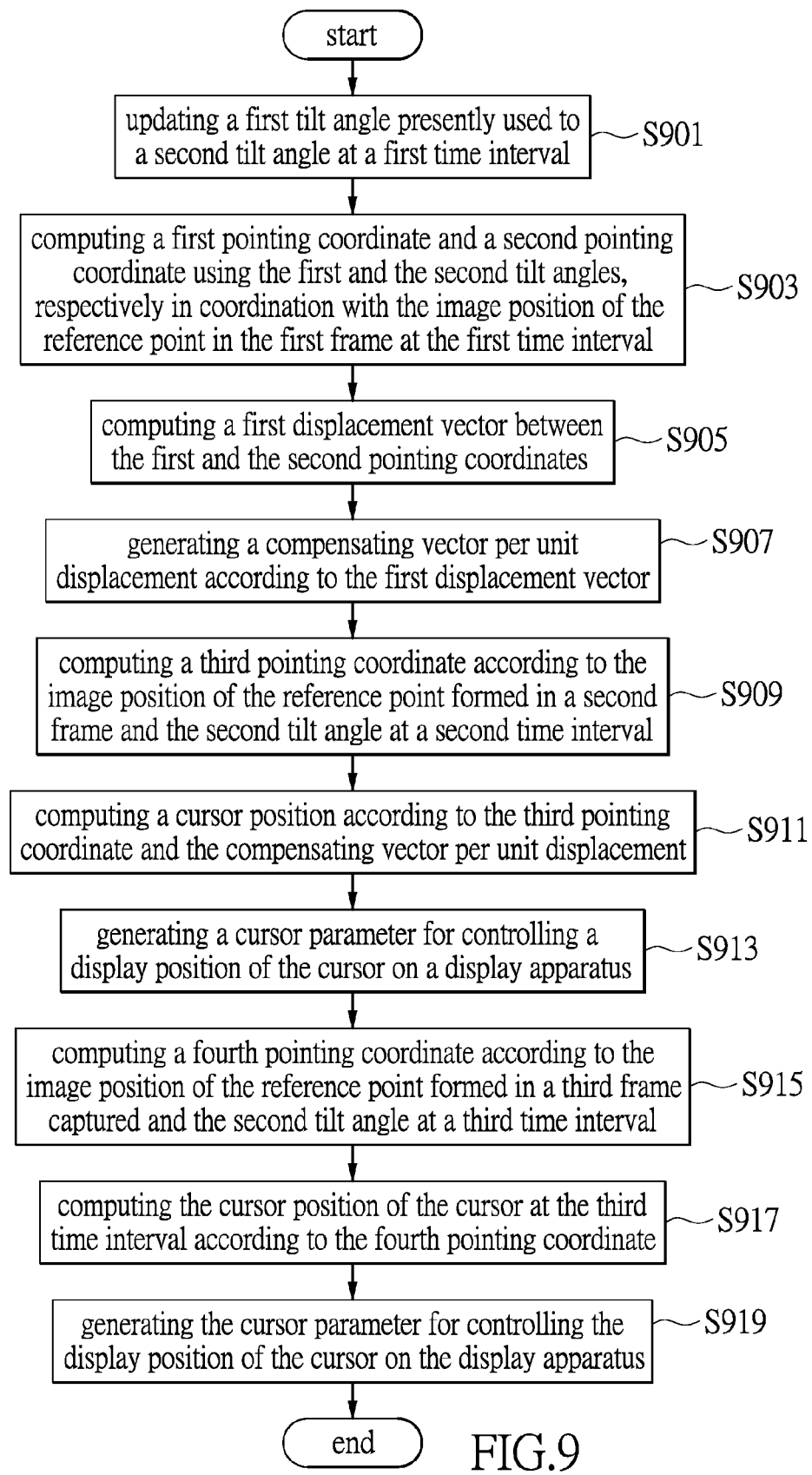
FIG. 9 is a flowchart diagram illustrating a positioning method of a handheld device provided in accordance to another exemplary embodiment of the present disclosure.

From the aforementioned exemplary embodiments, the present disclosure can generalize another pointer positioning method for the aforementioned handheld device of the interactive system. Please refer to FIG. 9 in conjunction with FIG. 1 and FIG. 2. FIG. 9 shows a flowchart diagram illustrating a pointer positioning method provided in accordance to another exemplary embodiment of the present disclosure. The pointer positioning method of FIG. 9 can be implemented by programming the processing unit 13 via firmware design and executed by the processing unit 13 during the operation of the handheld device 10.

In Step S901, the processing unit 13 of the handheld device 10 updated a first tilt angle presently used in the cursor position computation to a second tilt angle at a first time interval. To put it concretely, the processing unit 13 operatively reads accelerations of the handheld device 10 over multiple axes (e.g., X-axis, Y-axis, and Z-axis) detected by the accelerometer unit 12. Particularly, the accelerometer unit 12 operatively generates an acceleration vector according to the accelerations of the handheld device 10 detected and generates an acceleration vector accordingly to the processing unit 13 in signal form (i.e., the acceleration sensing signal). The processing unit 13 then computes the instant tilt angle of the handheld device 10 using Eqs. (1)~(3) with the acceleration vector of the handheld device 10 and the included angles computed between any two axes and correspondingly updates the first tilt angle presently used to the second tilt angle.

In the first time interval, the processing unit 13 drives the image capturing unit 11 to capture and generate a first frame containing the reference point 21.

In Step S903, the processing unit 13 computes a first pointing coordinate and a second point coordinate at the first time interval using the first tilt angle and the second tilt angle, respectively, in coordination with the image position of the reference point 21 formed in the first frame.

At the same time, the processing unit 13 computes the cursor position according to the first pointing coordinate and generates the cursor parameter accordingly for controlling the display position of the cursor 23 on the display apparatus 20. The processing unit 13 drives the communication unit 16 to wirelessly transmit the cursor parameter to the display apparatus 20 at the first time interval and causes the cursor 23 to be fixed at the first pointing coordinate. Cursor position computation and positioning methods are essentially the same as described in the aforementioned embodiment, and further details are hereby omitted.

In Step S905, the processing unit 13 computes a first displacement vector between the first pointing coordinates and the second pointing coordinate.

In Step S907, the processing unit 13 generates a compensating vector per unit displacement according to the first displacement vector. In one embodiment, the processing unit 13 operatively determines whether to compute the compensating vector per unit displacement based on a predetermined number of calibrations or a constant amount of compensation per calibration according to an angle difference between the first and the second tilt angles and/or the first displacement vector. When the processing unit 13 determines to complete the pointing coordinate calibration within the predetermined number of calibration, the processing unit 13 computes the compensating vector per unit displacement by dividing a predetermined number of calibration or a calibration time from the first displacement vector computed. On the contrary, the processing unit 13 may set the compensating vector per unit displacement based on the amount of compensation per calibration and compute the number of calibrations by dividing the compensating vector per unit displacement from the first displacement vector.

It is worth to note that in on embodiment, the processing unit 13 may set the number of calibration or the calibration time according to a frame capturing rate or a predetermined time. In another embodiment, the processing unit 13 can also set the number of calibration, the calibration time, and the amount of compensation per each calibration based on the type of software application, e.g., type of game software, executed by the display apparatus 20. Calibration parameters configuration method has been detailed explained in above described embodiments, and further descriptions are hereby omitted.

In Step S909, the processing unit 13 drives the image capturing unit 11 to capture and generate a second frame containing the reference point 21 in a second time interval. The processing unit 13 further computes a third pointing coordinate according to the image position of the reference point formed in the second frame and the second tilt angle. The second time interval occurs after the first time interval. That is, the second frame is captured at a later time than the first frame.

In Step S911, the processing unit 13 initiates a cursor position calibration program in the second time interval and computes the cursor position according to the third pointing coordinate and the compensating vector per unit displacement. Particularly, the processing unit 13 implements the cursor position calibration method depicted in FIG. 6 and calibrates the third pointing coordinate.

In Step S913, the processing unit 13 computes the display position of the cursor 23 on the display apparatus 20 at the second time interval. More specifically, the processing unit 13 computes and generates the cursor parameter according to the third pointing coordinate for controlling the display position of the cursor 23 on the display apparatus 20. The processing unit 13 further drives the communication unit 16 to wirelessly transmit the cursor parameter to the display apparatus 20 to control the display position of the cursor 23 on the display apparatus 20 at the second time interval.

In Step S915, the processing unit 13 drives the image capturing unit 11 to capture and generate a third frame containing the reference point at a third time interval. The processing unit 13 then computes a fourth pointing coordinate according to the image position of the reference point 21 formed in the third frame and the second tilt angle. The third time interval occurs after the second time interval. That is, the third frame is captured at a later time than the second frame. The time interval between the second and third time interval can be designed based on the preset number of calibrations or the preset calibration time configured.

In Step S917, the processing unit 13 computes the display position of the cursor 23 on the display apparatus 20 at the third time interval according to the fourth pointing coordinate. In Step S919, the processing unit 13 generates the cursor parameter for controlling the display position of the cursor 23 on the display apparatus 20. The processing unit 13 further drives the communication unit 16 to wirelessly transmit the cursor parameter to the display apparatus 20 to control the display position of the cursor 23 on the display apparatus 20 at the third time interval.

It is worth to note that, during the second time interval, the processing unit 13 may determine whether to calibrate and compensate pointing coordinates computed using the second tilt angle according to the first displacement vector and/or the angle difference between the first and the second tilt angles. In particular, when the first displacement vector between the first and the second pointing coordinate is less than a first predetermined threshold (e.g., 5 pixels) and/or the angle difference between the first and the second tilt angle is smaller than a preset angle (e.g., 20 degrees), the processing unit 13 does not initiate the cursor position calibration program and computes the cursor position directly according to the third pointing coordinate. Thereafter, the processing unit 13 generates the cursor parameter for controlling the display position of the cursor 23 on the display apparatus 20, accordingly.

Additionally, the processing unit 13 in the instant embodiment can further store the first and the second tilt angles, the first pointing coordinate, the second pointing coordinate, the third pointing coordinate, the first displacement vector, the compensating vector per unit displacement in the memory unit 15. Those skilled in the art should be able to program the processing unit 13 to utilize algorithm for determining whether to update the first tilt angle to the second tilt angle in the first time interval via firmware design. That is, the processing unit 13 can be programmed with necessary program codes to determine whether the handheld device 10 is in motion or at rest e.g., whether the reference point 21 or the pointing coordinate associated with the position of the reference point 21 has substantially moved, to determine whether to update the tilt angle presently used by the handheld device 10 in the cursor position computation.

It should be noted that FIG. 9 is merely used to describe a pointer positioning method for the handheld device 10 and the present disclosure is not limited thereto.

Additionally, the present disclosure also discloses a non-transitory computer-readable media for storing the computer executable program codes of the pointer position methods depicted in FIG. 3, FIG. 8, and FIG. 9 as well as the cursor position calibration method depicted in FIG. 6. The non-transitory computer-readable media may be a floppy disk, a hard disk, a compact disk (CD), a flash drive, a magnetic tape, accessible online storage database or any type of storage media having similar functionality known to those skilled in the art.

In summary, exemplary embodiments of the present disclosure provide a handheld device and a pointer positioning method thereof. The handheld device and the pointer method thereof area can be adapted for controlling the operation of a cursor displayed on a display apparatus. The pointer positioning method disclosed operatively calibrates and corrects pointing coordinates in the computation of cursor position after the handheld device updated the tilt angle thereof so that the display position of the cursor can be adjusted to gradually move to the correct position which the handheld device actually point toward within a preset calibration time or a preset number of calibration. Accordingly, the issue of the cursor suddenly jump from one place to another after the tilt angle has updated can be effectively avoid. Thereby, enhance the stability of the handheld device and at the same time, the operation convenience and of the user.

Moreover, the pointer positioning method enables the handheld device to actively determine whether to calibrate the pointing coordinate computed using the updated tilt angle and the associated calibration and compensation method based on the degree of precision required by the type of software application executed on the display apparatus and the resolution of the display apparatus, thereby enhances the practicality and applicability of the handheld device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A positioning method performed in a handheld device, comprising:
   obtaining a first image position of a reference;
   computing a first pointing coordinate according to the first image position and a first tilt angle indicative of a rotation angle of the handheld device;
   computing a second pointing coordinate according to the first image position and a second tilt angle that is rendered based on a movement of the first image position of the reference;
   computing a first displacement vector between the first pointing coordinate and the second pointing coordinate, and generating a unit displacement;
   obtaining a second image position of the reference;
   computing a third pointing coordinate according to the second image position and the second tilt angle; and
   obtaining an output pointing coordinate according to the third pointing coordinate and the unit displacement, wherein the step of obtaining the output pointing coordinate further includes:
   a) setting a number of calibrations as N, a compensation vector as C and a calibration coordinate, wherein the calibration coordinate is the third pointing coordinate;
   b) determining whether the first displacement vector is greater than a predetermined threshold;
   c) setting N equal to the first displacement vector divided by C when it is determined that the first displacement vector is greater than the predetermined threshold, wherein C is a predetermined compensation value; setting C equal to the first displacement vector divided by N when it is determined that the first displacement vector is less than the predetermined threshold, wherein N is a predetermined number of calibrations;
   d) computing a sum of the calibration coordinate and C to generate a compensated pointing coordinate;
   e) executing N-1 and determining whether N is equal to zero; and
   f) setting a fourth pointing coordinate to be the calibration coordinate and returning to step d) upon determined that N is not equal to zero; wherein the forth pointing coordinate is computed according to an image position of the reference and the second tilt angle.

2. The method according to claim 1, wherein the unit displacement is computed according to the first displacement vector in a predetermined number of calculations.

3. The method according to claim 2, wherein the first displacement vector indicates a difference between the first tilt angle and the second tilt angle.

4. The method according to claim 3, wherein the difference is reduced by performing the positioning method a number of times.

5. The method according to claim 4, wherein the output pointing coordinate is outputted when the difference is smaller than a preset angle.

6. The method according to claim 1, wherein the first image position and the second image position of the reference are formed in frames captured by an image sensor of the handheld device.

7. The method according to claim 6, wherein the second pointing coordinate is computed when a tilt angle of the handheld device is updated from the first tilt angle to the second tilt angle.

8. The method according to claim 7, wherein the handheld device updates the first tilt angle to the second tilt angle upon determined that the reference has not substantially moved.

9. The method according to claim 8, wherein the handheld device determines whether the reference has substantially moved by determining whether the image position of the reference formed in the frames has moved.

10. The method according to claim 7, wherein the handheld device updates the first tilt angle to the second tilt angle upon determined that a displacement computed between the first image position and the second image position of the reference formed in any two consecutive frames is less than a predefined displacement threshold.

11. The method according to claim 7, wherein the handheld device updates the first tilt angle to the second tilt angle upon determined that a velocity computed between the first image position and the second image position of the reference formed in any two consecutive frames is less than a predefined velocity threshold.

12. The method according to claim 7, wherein the handheld device updates the first tilt angle to the second tilt angle upon determined that a magnitude of an acceleration vector of the handheld device is equal to a gravitational acceleration of the handheld device, wherein the acceleration vector is generated by the handheld device according to accelerations of the handheld device detected over multiple axes.

13. The method according to claim 1, further comprising:
g) determining whether to update the second tilt angle to a third tilt angle;
h) computing a second displacement vector generated as the handheld device rotates; and
i) computing the sum of the calibration coordinate, the second displacement vector, and C to generate the compensated pointing coordinate.

14. A handheld device, comprising:
an image capturing unit configured to capture images of frames containing a reference;
a processing unit, coupled to the image capturing unit, configured to perform a positioning method for:
obtaining a first image position of the reference;
computing a first pointing coordinate according to the first image position and a first tilt angle indicative of a rotation angle of the handheld device;
computing a second pointing coordinate according to the first image position and a second tilt angle that is rendered based on a movement of the first image position of the reference;
computing a first displacement vector between the first pointing coordinate and the second pointing coordinate, and generating a unit displacement;
obtaining a second image position of the reference;
computing a third pointing coordinate according to the second image position and the second tilt angle; and
obtaining an output pointing coordinate according to the third pointing coordinate and the unit displacement, wherein the step of obtaining the output pointing coordinate in the positioning method further includes:
  a) setting a number of calibrations as N, a compensation vector as C and a calibration coordinate, wherein the calibration coordinate is the third pointing coordinate;
  b) determining whether the first displacement vector is greater than a predetermined threshold;
  c) setting N equal to the first displacement vector divided by C when it is determined that the first displacement vector is greater than the predetermined threshold, wherein C is a predetermined compensation value; setting C equal to the first displacement vector divided by N when it is determined that the first displacement vector is less than the predetermined threshold, wherein N is a predetermined number of calibrations;
  d) computing a sum of the calibration coordinate and C to generate a compensated pointing coordinate;
  e) executing N-1 and determining whether N is equal to zero; and
  f) setting a fourth pointing coordinate to be the calibration coordinate and returning to step d) upon determined that N is not equal to zero; wherein the forth pointing coordinate is computed according to an image position of the reference and the second tilt angle.

15. The handheld device according claim 14, wherein the processing unit drives the image capturing unit to capture a first frame containing the reference to respectively compute the first pointing coordinate and the second pointing coordinate using the first and the second tilt angles in coordination with the first frame.

16. The handheld device according to claim 14, wherein the step in the positioning method performed by the processing unit further comprising:
g) determining whether to update the second tilt angle to a third tilt angle;
h) computing a second displacement vector generated as the handheld device rotates; and
i) computing the sum of the calibration coordinate, the second displacement vector, and C to generate the compensated pointing coordinate.

17. The handheld device according to claim 16, wherein the processing unit executes the following steps before executing step d):
a) determining whether to cause the handheld device to update the second tilt angle to a third tilt angle during the computation of a compensated pointing coordinate;
b) computing a second displacement vector generated as the handheld device rotates when it is determined that the handheld device has updated the second tilt angle to the third tilt angle; and
c) computing the sum of the calibration coordinate, the second displacement vector and C to generate the compensated pointing coordinate.

18. The handheld device according claim 17, further comprising:
an accelerometer unit, coupled to the processing unit, configured to detect a plurality of accelerations of the handheld device over multiple axes and generate an acceleration vector.

19. The handheld device according to claim 18, wherein the handheld device updates the first tilt angle to the second tilt angle upon determined that a magnitude of an acceleration vector of the handheld device is equal to a gravitational acceleration of the handheld device, wherein the acceleration vector is generated by the handheld device according to accelerations of the handheld device detected over multiple axes.

20. The handheld device according to claim 14 wherein the processing unit is configured to compute the unit displacement according to the first displacement vector in a predetermined number of calculations.

* * * * *